(12) United States Patent
Li et al.

(10) Patent No.: US 10,603,701 B2
(45) Date of Patent: Mar. 31, 2020

(54) BIOREMEDIATION OF 1,4-DIOXANE AND CHLORINATED ALIPHATIC HYDROCARBONS BY PROPANOTROPHIC BACTERIA

(71) Applicant: New Jersey Institute of Technology, Newark, NJ (US)

(72) Inventors: Mengyan Li, Clifton, NJ (US); Daiyong Deng, Millburn, NJ (US)

(73) Assignee: New Jersey Institute of Technology, Newark, NJ (US)

(*) Notice: Subject to any disclaimer, the term of this patent is extended or adjusted under 35 U.S.C. 154(b) by 0 days.

(21) Appl. No.: 16/241,547

(22) Filed: Jan. 7, 2019

(65) Prior Publication Data

US 2019/0224731 A1   Jul. 25, 2019

Related U.S. Application Data

(60) Provisional application No. 62/619,994, filed on Jan. 22, 2018.

(51) Int. Cl.
| | |
|---|---|
| *B09C 1/10* | (2006.01) |
| *B09C 1/00* | (2006.01) |
| *C02F 3/34* | (2006.01) |
| *B09C 1/08* | (2006.01) |
| *C02F 101/36* | (2006.01) |
| *C02F 101/34* | (2006.01) |
| *C02F 103/06* | (2006.01) |

(52) U.S. Cl.
CPC .............. *B09C 1/10* (2013.01); *B09C 1/002* (2013.01); *B09C 1/08* (2013.01); *C02F 3/341* (2013.01); *C02F 3/348* (2013.01); *B09C 2101/00* (2013.01); *C02F 2101/34* (2013.01); *C02F 2101/366* (2013.01); *C02F 2103/06* (2013.01); *C02F 2209/36* (2013.01)

(58) Field of Classification Search
CPC ....... B09C 1/10; B09C 1/002; B09C 2101/00; B09C 1/08; C02F 3/341; C02F 3/348; C02F 2209/36; C02F 2101/366; C02F 2101/34; C02F 2103/06
USPC ....................................... 210/611; 435/262.5
See application file for complete search history.

(56) References Cited

U.S. PATENT DOCUMENTS

2013/0337518 A1* 12/2013 Razavi-Shirazi ....... C02F 3/348
                                                              435/140

OTHER PUBLICATIONS

Daiyong Deng, et al., "Synchronic Biotransformation of 1,4-Dioxane and 1,1-Dichloroethylene by a Gram-Negative *Propanotroph azoarcus* sp. DD4" Environmental Science & Technology Letters, 5:526-532 (Jul. 2018).

(Continued)

*Primary Examiner* — Fred Prince
(74) *Attorney, Agent, or Firm* — Servilla Whitney LLC

(57) ABSTRACT

Methods of removing dioxane and optionally one or more CAHs such as 1,1-DCE, cis-1,2-DCE, trans-1,2-DCE, 1,2-DCA, 1,1-DCA, VC, and TCE from a liquid medium contaminated therewith include applying a feedstream of propane to the liquid medium in the presence of at least one propanotrophic bacteria strain selected from *Azoarcus* sp. DD4 (DD4) and *Mycobacterium* sp. DT1 (DT1). Propane, 1-propanol and/or 1-butanol may be employed as substrates in the bioaugmentation of the propanotrophic bacteria strain.

14 Claims, 20 Drawing Sheets

Specification includes a Sequence Listing.

(56) References Cited

OTHER PUBLICATIONS

J.S. Han, et al., "Optimization of biological wastewater treatment conditions for 1,4-dioxane decomposition in polyester manufacturing processes" Water Science and Technology, 59.5: 995-1002 (2009).

Michael J. K. Nelson et al., "Aerobic Metabolism of Trichloroethylene by a Bacterial Isolate" Applied and Environmental Microbiology, p. 383-384 vol. 52, No. 2 (Aug. 1986).

Jerome J. Kukor, et al., "Molecular Cloning, Characterization, and Regulation of a Pseudomonas pickettii PKO1 Gene Encoding Phenol Hydroxylase and Expression of the Gene in Pseudomonas aeruginosa PAO1c" Journal of Bacteriology, p. 4624-4630, vol. 172, No. 8 (Aug. 1990).

Kwang-Mu Yen, et al., "Cloning and Characterization of a Pseudomonas mendocina KR1 Gene Cluster Encoding Toluene-4-Monooxygenase" Journal of Bacteriology, p. 5315-5327 vol. 173, No. 17 (Sep. 1991).

Dirk Bernhardt, et al., "Degradation of dioxane, tetrahydrofuran and other cyclic ethers by an environmental Rhodococcus strain" Applied Microbiology Biotechnology 36:120-123 (1991).

Gregory M. Whited, et al., "Separation and Partial Characterization of the Enzymes of the Toluene-4-Monooxygenase Catabolic Pathway in Pseudomonas mendocina KR1" Journal of Bacteriology, p. 3017-3020, vol. 173, No. 9 (May 1991).

R. E. Parales, et al., "Degradation of 1,4-Dioxane by an Actinomycete in Pure Culture" Applied and Environmental Microbiology, p. 4527-4530, vol. 60, No. 12 (Dec. 1994).

Michael Ashburner, et al., "Gene Ontology: tool for the unification of biology" National Institute of Health, Nat Genet. ; 25(1): 25-29 (May 2000).

Ulrike Kohlweyer, et al., "Tetrahydrofuran degradation by a newly isolated culture of Pseudonocardia sp. strain K1" FEMS Microbiology Letters 186, pp. 301-306 (Mar. 2000).

Sara L. Kelley, et al., "Biodegradation of 1,4-Dioxane in Planted and Unplanted Soil: Effect of Bioaugmentation With *Amycolata* sp. CB1190" Wat. Res. vol. 35, No. 16, pp. 3791-3800 (Feb. 2001).

John Besemer, et al., "GeneMarkS: a self-training method for prediction gene starts in microbial genomes. Implications for filing sequence motifs in regulatory regions" Nuckeuc Acuds REsearch, vol. 29, No. 12, p. 2607-2618 (May 2001).

Weizhong Li, et al., "Tolerating some redundancy significantly speeds up clustering of large protein databases" Bioinformatics, vol. 18, No. 1, pp. 77-82 (Jul. 2001).

Barbara Thiemer, et al., "Cloning and characterization of a gene cluster involved in tetrahydrofuran degradation in Pseudonocardia sp. strain K1" Arch Microbiol, vol. 179: pp. 266-277 (Mar. 2003).

Eugenio Notomista, et al., "Evolution of Bacterial and Archaeal Multicomponent Monooxygenases" Journal of Molecular Evolution, vol. 56: p. 435-444 (2003).

Joseph G. Leahy, et al., "Evolution of the soluble diiron monooxygenases" FEMS Microbiology Reviews 27, 449-479 (Mar. 2003).

Roman L Tatusov, et al., "The COG database: an updated version includes eukaryotes" BMC Bioinformatics, 4:41 (Sep. 2003).

Brigitte Boeckmann, et al., "The Swiss-Prot protein knowledgebase and its supplement TrEMBL in 2003" Nucleic Acids Research, vol. 31, No. 1 365-370 (2003).

Vadivel Prabahar, et al., "*Pseudonocardia antarctica* sp. nov. an Actinomycetes from McMurdo Dry Valleys, Antarctica" Systematic and Applied Microbiology, 27, 66-71 (2004).

Peter Kämpfer, et al., "*Pseudonocardia benzenivorans* sp. nov." International Journal of Systematic and Evolutionary Microbiology, 54, 749-751 (2004).

Kung-Huichu, et al., "Stable Carbon Isotope Fractionation during Aerobic Biodegradation of Chlorinated Ethenes" Environmental Science & Technology, vol. 38, No. 11, 3126-3130 (2004).

Kunichika Nakamiya, et al., "Degradation of 1,4-Dioxane and Cyclic Ethers by an Isolated Fungus" Applied and Environmental Microbiology, p. 1254-1258, vol. 71, No. 3 (Mar. 2005).

Simon Vainberg, et al., "Biodegradation of Ether Pollutants by Pseudonocardia sp. Strain ENV478", Applied and Environmental Microbiology, p. 5218-5224 vol. 72, No. 8 (Aug. 2006).

Minoru Kanehisa, et al., "From genomics to chemical genomics: new developments in KEGG" Nucleic Acids Research, vol. 34, Database issue doi:10.1093/nar/gkj102, D354-D357 (2006).

Lisa Alvarez-Cohen, et al., "Kinetics of 1,4-dioxane biodegradation by monooxygenase-expressing bacteria" Environmental Science and Technology 40, 5435-5442 (Oct. 2006).

Nicholas V. Coleman, et al., "Soluble di-iron monooxygenase gene diversity in soils, sediments and ethene enrichments" Environmental Microbiology, 8(7), 1228-1239 (2006).

Shaily Mahendra, et al., "Identification of the Intermediates of in Vivo Oxidation of 1,4-Dioxane by Monooxygenase-Containing Bacteria" Environmental Science and Technology, vol. 41, No. 21, 7330-7336 (2007).

Young-Mo Kim, et al, "Biodegradation of 1,4-dioxane and transformation of related cyclic compounds by a newly Isolated *Mycobacterium* sp. PH-06" Biodegradation 20:511-519 (2009).

Kristin Skinner, et al., "Metabolism and Cometabolism of Cyclic Ethers by a Filamentous Fungus, a *Graphium* sp." Applied and Environmental Microbiology, p. 5514-5522 vol. 75, No. 17 (Sep. 2009).

Byoung Koun Min, et al., "Tuning of the photocatalytic 1,4-dioxane degradation with surface plasmon resonance of gold nanoparticles on titania" Catalysis Communications 10, 712-715 (2009).

Mengyan Li, et al., "1,4-Dioxane biodegradation at low temperatures in Arctic groundwater samples" Water Research 14, 2894-2900 (2010).

Bozhi Sun, et al., "Biodegradation of 1,4-dioxane by a Flavobacterium" Biodegradation 22:651-659 (2011).

Hisako Masuda, et al., "Biodegradation of Tetrahydrofuran and 1,4-Dioxane by Soluble Diiron Monooxygenase in *Pseudonocardia* sp. Strain ENV478" Journal of Molecular Micrbiology and Biotechnology, 22:312-316 (2012).

Minoru Kanehisa, et al., "KEGG for integration and interpretation of large-scale molecular data sets" Nucleic Acids Research, vol. 40, Database issue doi:10.1093/nar/gkr988, D109-D114 (2011).

Kazunari Sei, et al., "Isolation and characterization of Tetrahydrofuran-Degrading Bacteria for 1,4-Dioxane-Containing Wastewater Treatment by Co-Metabolic Degradation" Journal of Water Enviornment Technology, vol. 11, No. 1, 11-19 (2013).

Kazunari Sei, et al., "Isolation and characterization of bacterial strains that have high ability to degrade 1,4-dioxane as a sole carbon and energy source" Biodegradation 24, 665-674 (2012).

Christopher Sales, et al., "Oxidation of the Cyclic Ethers 1,4 Dioxane and Tetrahydrofuran by a Monooxygenase in Two Pseudonocardia Species" Applied and Environmental Microbiology, vol. 79 No. 24, 7702-7708 (Dec. 2013).

Mengyan Li, et al., "The Abundance of Tetrahydrofuran/Dioxane Monooxygenase Genes (thmA/dxmA) and 1,4-Dioxane Degradation Activity Are Significantly Correlated at Various Impacted Aquifers" American Chemical Society, Environmental Science & Technology Letters 1, 122-127 (2014).

Shaily Mahendra, et al., "The impact of chlorinated solvent co-contaminants on the biodegradation kinetics of 1,4-dioxane" Chemosphere 91, 88-92 (2013).

Milton H. Saier Jr., et al., "The Transporter Classification Database" Nucleic Acids Research, vol. 42, Database issue doi:10.1093/nar/gkt1097, pp. D251-D258 (2014).

Huanlin Huang, et al., "Biodegradation of 1,4-Dioxane by a Novel Strain and Its Biodegradation Pathway" Water Air Soil Pollut 225:2135, 11 pages (2014).

David Lippincott, et al., "Bioaugmentation and Propane Biosparging for In Situ Biodegradation of 1,4-Dioxane" Groundwater Monitoring & Remediation 35, No. 2, 81-92 (2015).

Arulazhagan Pugazhendi, et al., "Biodegradation of 1,4-dioxane by Rhodanobacter AYS5 and the role of additional substrates" Ann Microbiology 65:2201-2208 (2015).

Steven Hand, et al., "Biodegradation of 1,4-dioxane: Effects of enzyme inducers and trichloroethylene" Science of the Total Environment, 520:154-159 (2015).

(56) References Cited

OTHER PUBLICATIONS

Daisuke Inoue, et al., "1,4-Dioxane degradation potential of members of the genera *Pseudonocardia* and *Rhodococcus*" Biodegradation, DOI 10.1007/s10532-016-9772-7, 10 pages (2016).

Shu Zhang, et al., "Biodegradation Kinetics of 1,4-Dioxane in Chlorinated Solvent Mixtures" American Chemical Society, Environmental Science & Technology 50: 9599-9607 (2016).

Ryotaro Matsui, et al., "Identification and characterization of 1,4-dioxane-degrading microbe separated from surface seawater by the seawater-charcoal perfusion apparatus" Biodegradation, 27:155-163 (Apr. 2016).

Dong-Zhi Chen, et al., "Intermediates and substrate interaction of 1,4-dioxane degradation by the effective metabolizer Xanthobacter flavus DT8" International Biodeterioration & Biodegradation, 106:133-140 (2016).

YuYang Zhou, et al., "Multi-substrate biodegradation interaction of 1, 4-dioxane and BTEX mixtures by Acinetobacter baumannii DD1" Biodegradation 27:37-46 (Jan. 2016).

Ya He, et al., "1,4-Dioxane Biodegradation by *Mycobacterium dioxanotrophicus* PH-06 Is Associated with a Group-6 Soluble Di-Iron Monooxygenase" Environmental Science & Technology Letters, 4, 494-499 (Oct. 2017).

Daiyong Deng, et al., "A Novel Propane Monooxygenase Initiating Degradation of 1,4-Dioxane by *Mycobacterium dioxanotrophicus* PH-06" Environmental Science & Technology Letters 5, 86-91 (Dec. 2017).

Helisson Faoro, et al., "The oil-contaminated soil diazotroph *Azoarcus olearius* DQS-4T is genetically and phenotypically similar to the model grass endophyte *Azoarcus* sp. BH72" Environmental Microbiology Reports 9(3), 223-238 (2017).

\* cited by examiner

BIOREMEDIATION OF 1,4-DIOXANE AND CHLORINATED ALIPHATIC HYDROCARBONS BY PROPANOTROPHIC BACTERIA

CROSS-REFERENCE TO RELATED APPLICATIONS

This application claims the benefit of U.S. Provisional Patent Application No. 62/619,994 filed Jan. 22, 2018, the entirety of which is incorporated by reference herein.

STATEMENT REGARDING FEDERALLY SPONSORED RESEARCH

This invention was made with government support under Grant No. 2018NJ400B awarded by the U.S. Geological Service. The government has certain rights in the invention.

FIELD OF THE DISCLOSURE

The present disclosure relates to bioremediation of multiple contaminants, and in particular, to bioremediation using selected bacteria.

BACKGROUND

Remediation of mixed pollutants with disparate properties is a major challenge necessitating action to develop effective treatment synergies. Chlorinated aliphatic hydrocarbons (CAHs) are high priority groundwater pollutants detected in the U.S. During the 20th century, CAHs, such as 1,1,1-trichloroethane (1,1,1-TCA) and trichloroethene (TCE), were widely used as "safety solvents" for weapon rinsing and pipeline degreasing at industrial and military facilities.

1,4-dioxane (dioxane), a cyclic ether, is an emerging water contaminant in the U. S and globally. Dioxane was added as a stabilizer to prevent degradation of chlorinated solvents, primarily 1,1,1-TCA, at an approximate volumetric ratio of 3.5%. This is of particular concern since dioxane is a probable human carcinogen and is subject to a stringent drinking water advisory level of 0.35 µg/L at the one to one million lifetime cancer risk. The remediation standard of dioxane has been reduced by various state and federal regulation agencies. The combination of extensive use, historical disposal, and persistent property of chlorinated solvents and dioxane has resulted in commingled plumes being prevalently formed in thousands of sites in the U.S. Many CAH-contaminated sites were considered "closed", but were re-opened because dioxane was detected at those sites. Remediation of 1,4-dioxane and CAHs has become more urgent and relevant.

SUMMARY

Disclosed herein are propanotrophic bacteria strains and methods of use thereof for removal of dioxane and some CAHs, including cis-1,2-dichloroethene (cis-1,2-DCE), 1,1-dichloroethylene (1,1-DCE), 1,2-dichloroethane (1,2-DCA), 1,1-dichloroethane (1,1-DCA), trans-1,2-DCE, vinyl chloride (VC), and TCE from liquid media such as water.

To date, some physical and chemical treatments including nanoparticles, heated vapor extraction, and advanced oxidation processes have been exploited to remove dioxane and CAHs. However, these physical-chemical treatments require high energy consumption and high operational cost, making them less practical for the in situ remediation of the large contaminated plumes formed in the field. Bioremediation is a sustainable option given its cost effectiveness and inherent eco-friendly characteristics. Further, no commercialized bacterial strains are available in the market for in situ synchronic degradation of dioxane and CAHs. To date, only a few pilot-scale tests have been performed to treat contaminated water to remove/degrade dioxane using slow-growing Gram-positive bacteria that tend to form clumps, precluding effective subsurface distribution for in situ application. Bioremediation of CAHs has primarily employed strict anaerobes, *Dehalococcoides*, the activities of which are significantly inhibited by the presence of oxygen. Embodiments disclosed herein provide bacteria that degrades both dioxane and CAHs.

In accordance with one or more embodiments, a Gram-negative propanotrophic bacterium strain from the genus *Azoarcus*, designated as *Azoarcus* sp. DD4 (DD4), and methods of use, are disclosed that can effectively remove dioxane as well as the CAHs 1,1-DCE, cis-1,2-DCE, 1,2-DCA, and VC from liquid media such as water. DD4 can survive in a relatively cold environment at a temperature as low as 10° C., tolerate salinity conditions as high as 3% (as NaCl, w/v %) and pH in the range of from 5-9. Propane may be used as a primary substrate in the disclosed methods. It will be understood that other substrates such as but not limited to 1-propanol and 1-butanol may be employed. Degradation activity using DD4 and propane can be sustained by repeated amendment of propane or other substrates with few or no clumps formed. The disclosed methods effectively cometabolize dioxane and selected CAHs in both lab media and environmental contaminated groundwater samples and may be employed for in situ bioaugmentation with DD4 to enhance the removal of dioxane and CAHs at impacted fields. In addition to its fast and uniform growth, DD4's versatile degradation capabilities and resilience to commonly occurring co-contaminants outcompete other bioaugmentation strains. Importantly, DD4 is non-pathogenic and related species are commonly found with a symbiotic lifestyle with plants, implying its implementation for synergetic treatment with phytoremediation.

In still further embodiments, a propanotrophic bacterium strain designated as *Mycobacterium* sp. DT1 (DT1) and methods of use are disclosed that can effectively remove dioxane as well as a broad range of CAHs, such as cis-1,2-DCE, trans-1,2-DCE, 1,2-DCA, 1,1-DCA, and TCE, from liquid media such as water. Propane may be used as the primary substrate in the methods. Degradation activity using DT1 and propane can be sustained by repeated amendment of propane. The disclosed method effectively cometabolizes dioxane and TCE, as well as a number of other CAHs in lab media, and may be employed for in situ bioaugmentation with DT1 to enhance the removal of dioxane and CAHs at impacted fields.

In one or more embodiments disclosed is a method of removing dioxane and optionally one or more CAHs selected from 1,1-DCE, cis-1,2-DCE, trans-1,2-DCE, 1,2-DCA, 1,1-DCA and TCE from a liquid medium contaminated therewith by applying a feedstream of propane to the contaminated liquid medium in the presence of at least one propanotrophic bacteria strain selected from *Azoarcus* sp. DD4 (DD4) and *Mycobacterium* sp. DT1 (DT1). The method may include introducing DD4 or DT1 to the contaminated liquid medium. The method may include monitoring the level(s) of one or more of the dioxane and CAHs present in the liquid medium during the course of application of propane at selected intervals to determine the presence or absence, or level, of the contaminant in the liquid medium. In other embodiments the method may include measuring the level of the propanotrophic bacteria strain present in the liquid medium.

In one embodiment the method employs DD4 to remove dioxane and optionally one or more of the CAHs 1,1-DCE, cis-1,2-DCE, 1,2-DCA, and VC.

In another embodiment the method employs DT1 to remove dioxane and optionally one or more of the CAHs cis-1,2-DCE, trans-1,2-DCE, 1,2-DCA, 1,1-DCA, VC, and TCE.

In still further embodiments the method employs DD4 and DT1.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed gram-negative bacterium and associated systems and methods, reference is made to the accompanying figures, wherein:

(FIG. 8c) in accordance with one or more embodiments of the present disclosure;

FIG. 20b: 1,1-DCA and VC; FIG. 20c: 1,2-DCA) in accordance with one or more embodiments of the present disclosure. The concentrations in FIGS. 20a and 20b are in the aqueous phase and concentrations in FIG. 20c are in the gaseous phase.

BRIEF DESCRIPTION OF THE SEQUENCES

SEQ ID NO 1 is a primer of a prmADBC gene cluster in DD4;

SEQ ID NO 2 is a primer of a prmADBC gene cluster in DD4;

SEQ ID NO 3 is a primer of a prmADBC gene cluster in DD4;

SEQ ID NO 4 is a primer of a prmADBC gene cluster in DD4;

SEQ ID NO 5 is a primer of a tmoABCDEF gene cluster in DD4;

SEQ ID NO 6 is a primer of a tmoABCDEF gene cluster in DD4;

SEQ ID NO 7 is a primer of a tmoABCDEF gene cluster in DD4;

SEQ ID NO 8 is a primer of a tmoABCDEF gene cluster in DD4;

SEQ ID NO 9 is a primer of a gene encoding a SDIMO of DT1;

SEQ ID NO 10 is a primer of a gene encoding a SDIMO of DT1;

SEQ ID NO 11 is a primer of a gene encoding a SDIMO of DT1; and

SEQ ID NO 12 is a primer of a gene encoding a SDIMO of DT1.

DETAILED DESCRIPTION

The following is a detailed description provided to aid those skilled in the art in practicing the present subject matter disclosed herein. Those of ordinary skill in the art may make modifications and variations in the embodiments described herein without departing from the spirit or scope of the disclosed subject matter. Unless otherwise defined, all technical and scientific terms used herein have the same meaning as commonly understood by one of ordinary skill in the art to which this invention belongs. The terminology used in the description herein is for describing particular embodiments only and is not intended to be limiting of the invention. All publications, patent applications, patents, figures and other references mentioned herein are expressly incorporated by reference in their entirety.

Figure 3:
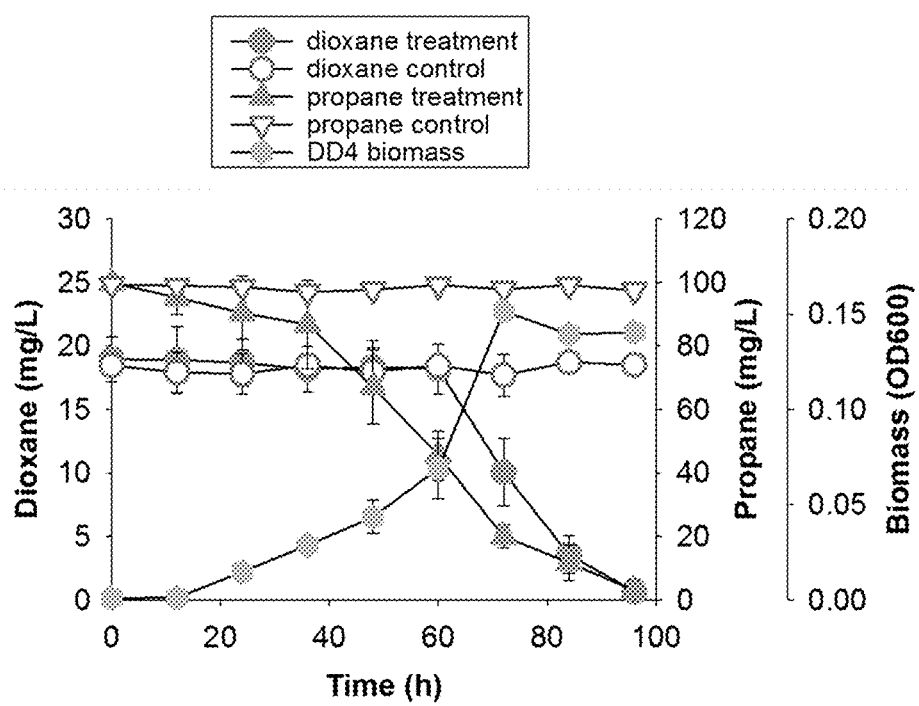
FIG. 3 is a graphical depiction reflecting degradation of propane, biomass accumulation, and cometabolism of dioxane by DD4 when fed with propane in accordance with one or more embodiments of the present disclosure.

With reference to FIGS. 3 and 5, the propanotrophic bacterial strain DD4 was isolated and identified which is capable of cometabolizing dioxane and the CAHs cis-1,2-DCE, 1,1-DCE, 1,2-DCA, and VC. In addition, the propanotrophic bacterium DT1 was isolated and identified which is capable of cometabolizing both dioxane and TCE (FIG. 19), one of the primary solvents that frequently co-exists with dioxane, as well as several CAHs (FIG. 20). As indicated in Table 1 below, DT1 exhibits a broad biodegradation versatility towards CAHs such as cis-1,2-DCE, trans-1,2-DCE, 1,1-DCA, and VC. It is notable from Table 1 that the combination of DD4 and DT1 can remove almost all the CAHs (except 1,1,1-TCA, which attenuated itself naturally) along with dioxane, providing a robust solution for the solvent-stabilizer co-contamination issue.

TABLE 1

CAHs Attenuated by DD4 and DT1

| | 1,4-D | TCE | 1,1,1-TCA | c-1,2-DCE | t-1,2-DCE | 1,1-DCE | 1,1-DCA | 1,2-DCA | VC |
|---|---|---|---|---|---|---|---|---|---|
| DD4 | + | − | − | + | − | + | − | + | + |
| DT1 | + | + | − | + | + | − | + | + | + |
| DD4 + DT1 | + | + | NA | + | + | + | + | + | + |

In one or more embodiments disclosed is a method of removing dioxane and optionally one or more CAHs selected from 1,1-DCE, cis-1,2-DCE, trans-1,2-DCE, 1,2-DCA, 1,1-DCA and TCE from a liquid medium contaminated therewith by applying a feedstream of propane to the contaminated liquid medium in the presence of at least one propanotrophic bacteria strain selected from Azoarcus sp. DD4 (DD4) and Mycobacterium sp. DT1 (DT1). The method may include introducing DD4 or DT1 to the contaminated liquid medium. The method may include monitoring the level(s) of one or more of the dioxane and CAHs present in the liquid medium during the course of application of propane at selected intervals to determine the presence or absence, or level, of the contaminant in the liquid medium. In other embodiments the method may include measuring the level of the propanotrophic bacteria strain present in the liquid medium.

In one embodiment the method employs DD4 to remove dioxane and optionally one or more of the CAHs 1,1-DCE, cis-1,2-DCE, 1,2-DCA, and VC. The method may include applying propane to the liquid medium until the dioxane and or one or more of the CAHs 1,1-DCE, cis-1,2-DCE and 1,2-DCA are present at or below a preselected limit.

In another embodiment the method employs DT1 to remove dioxane and optionally one or more of the CAHs cis-1,2-DCE, trans-1,2-DCE, 1,2-DCA, 1,1-DCA, VC, and TCE. The method may include applying propane to the contaminated liquid until the dioxane and or one or more of the CAHs cis-1,2-DCE, trans-1,2-DCE, 1,2-DCA, 1,1-DCA, VC, and TCE are present at or below a preselected limit.

In still further embodiments the method employs DD4 and DT1. The method may include applying propane to the liquid medium until the dioxane and or one or more of the CAHs 1,1-DCE, cis-1,2-DCE, trans-1,2-DCE, 1,2-DCA, 1,1-DCA, VC, and TCE are present at or below a preselected limit.

In yet further embodiments disclosed is a method of removing dioxane and optionally one or more CAHs selected from 1,1-DCE, cis-1,2-DCE and 1,2-DCA from a liquid medium contaminated therewith by applying a feedstream of propane, 1-propanol and/or 1-butanol to the contaminated liquid medium in the presence of DD4. The method may include introducing DD4 to the liquid medium.

EXAMPLES AND EXPERIMENTS

Bacterial Strain Azoarcus sp. DD4

Figure 1:
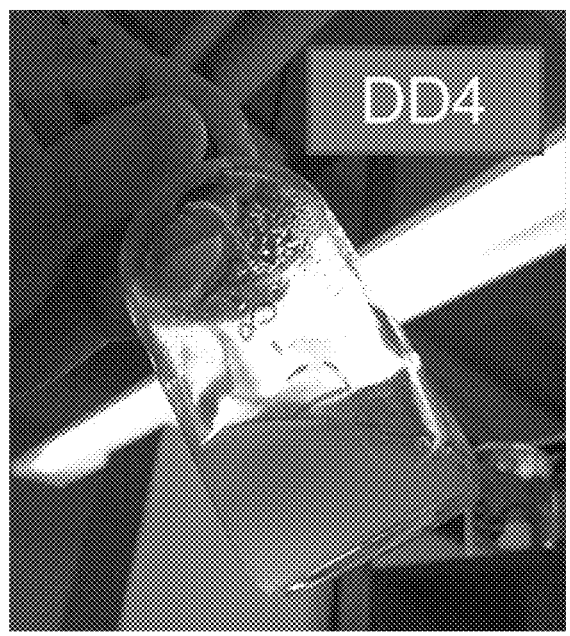
FIG. 1 is a photograph of a liquid culture of *Azoarcus* sp. DD4 in accordance with one or more embodiments of the present disclosure.
Figure 2:
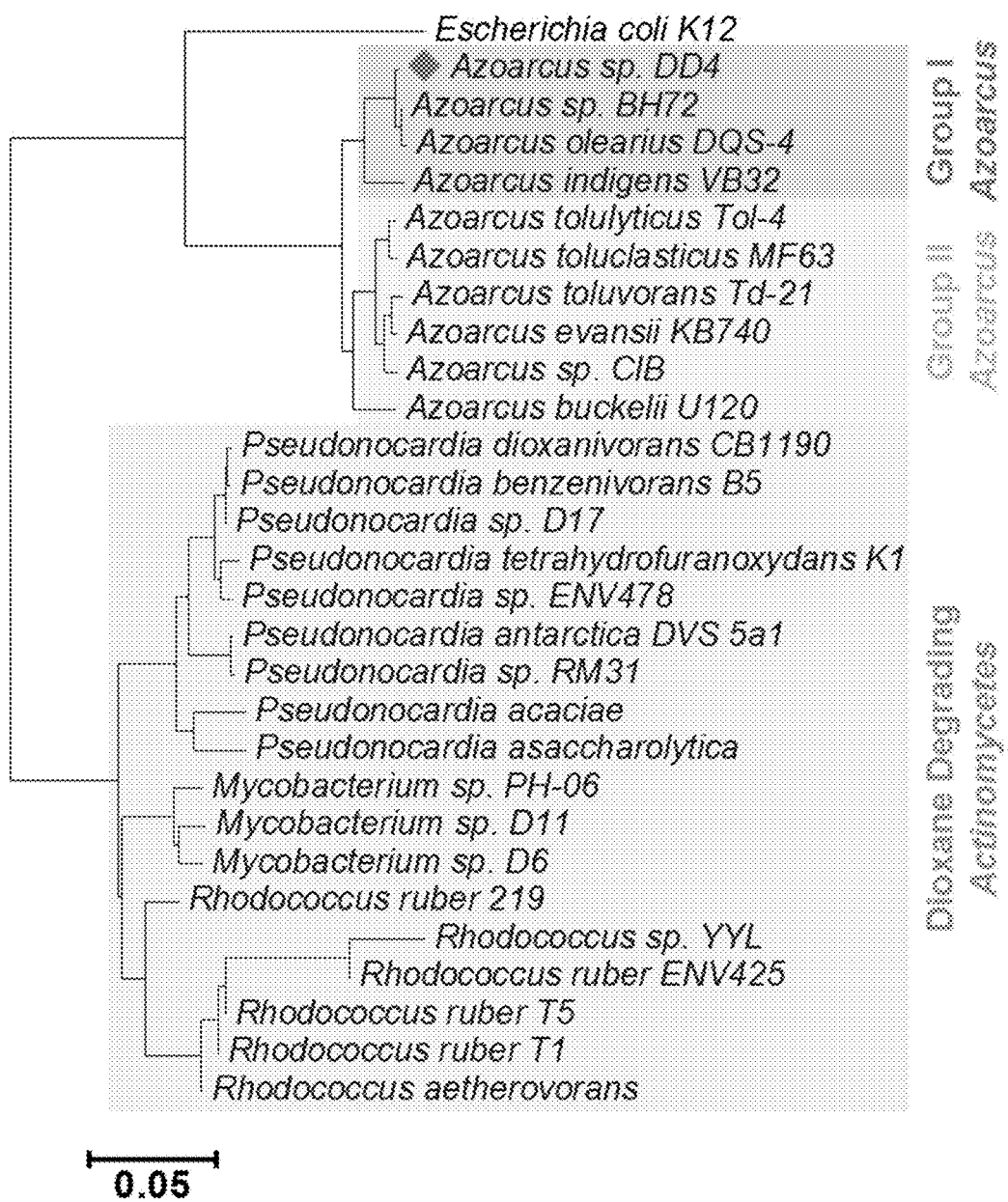
FIG. 2 is a depiction of a phylogenetic analysis of DD4 based on the nucleotide sequence of its 16S rRNA gene.

Isolation and identification of bacterial strain Azoarcus sp. DD4. An active sludge sample was obtained from a local wastewater treatment plant in northern New Jersey. Prior to the enrichment, 2.0 g of sludge (wet weight) was washed three times with sterile phosphate buffer solution (PBS, 20 mM, pH 7.2) to remove dissolved natural organic carbon sources. The washed sample was suspended in 20 mL NMS in a 120-mL serum bottle supplemented with an appropriate amount of propane and dioxane as carbon sources, and incubated on a rotary shaker at 160 rpm and 30° C. To suppress the growth of protozoa in the enrichment culture, the medium was amended with 10 mg/L cycloheximide. Bi-weekly, 0.2 mL of the supernatant of the culture was transferred into 20 mL of fresh NMS for further enrichment. Degradation of propane and dioxane was monitored during the enrichment. After two months of incubation, the final enrichment culture exhibiting fast propane and dioxane removal rates was diluted and plated onto R2A agar plates. After incubation at 30° C. for three days, morphologically distinct colonies were obtained. Individual colonies were transferred to 20 mL of NMS amended with propane and dioxane to verify dioxane co-metabolism. The verified microbes were subjected to further 1,1-DCE degradation screening. A bacterial strain grown on propane and co-metabolizing dioxane and 1,1-DCE was selected for further study. The selected isolate was identified by physiological and biochemical tests, and by 16S rRNA gene sequencing analysis, as shown in FIG. 2. The strain was designated as Azoarcus sp. DD4.

Co-metabolism of dioxane using propane as the primary substrate. The ability of strain DD4 to co-metabolize dioxane using propane as the primary substrate was evaluated with bench tests. DD4 cells were grown on propane in NMS at 30° C. while shaking at 150 rpm. Initial concentrations of 18.9±1.8 mg/L dioxane and 1.5% propane were added. The cultures were inoculated with DD4 at the initial biomass of 0.2 mg protein $L^{-1}$ in 60-ml serum vials sealed with rubber stoppers and aluminum crimp caps. The disappearance of propane and dioxane was monitored for 96 h. Aliquots (0.7 mL) were periodically sampled and filtered through a filter of 0.22 μm pore size. The filtrates were subjected to GC and GC-MS analysis. All degradation experiments were conducted in triplicate. Control treatments were prepared with DD4 cells killed by autoclave. With reference to FIGS. 3a and 3b, DD4 initially grew on propane and commenced the dioxane degradation after a lag time of approximately 60 h. At the incubation of 96 h, dioxane was removed from 18.9±1.8 mg/L to 0.6±0.1 mg/L. DD4 exhibited fast growth when fed with propane. The cell yield for strain DD4 was estimated as high as 0.249 mg protein (mg propane)$^{-1}$.

Figure 4A:
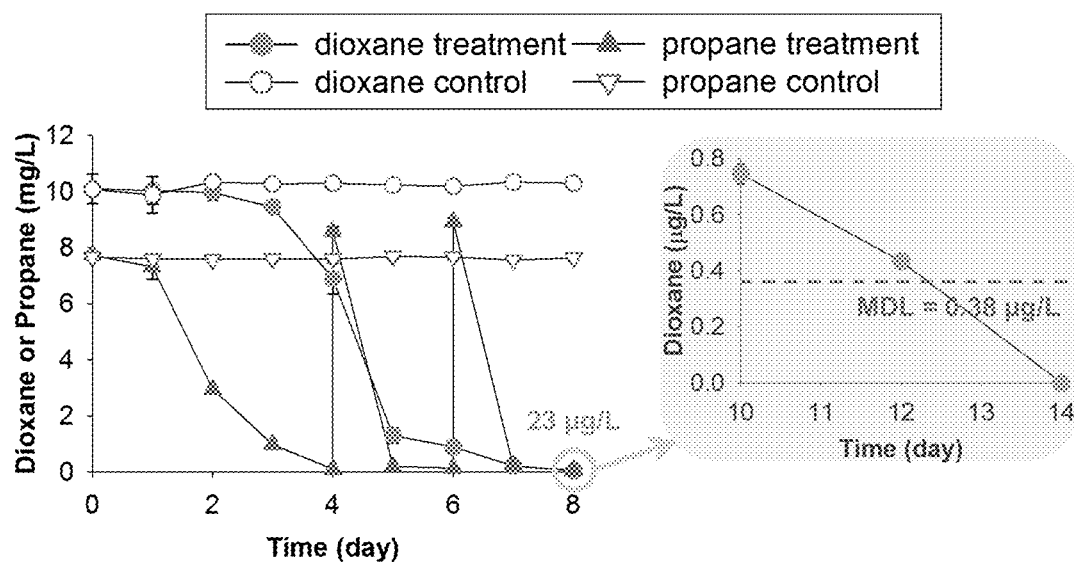
FIGS. 4a and 4b are graphical depictions reflecting biodegradation of dioxane in microcosms prepared with groundwater samples collected from the source zone of an impacted site in California and simulated dioxane contaminated water in accordance with one or more embodiments of the present disclosure.
Figure 4B:
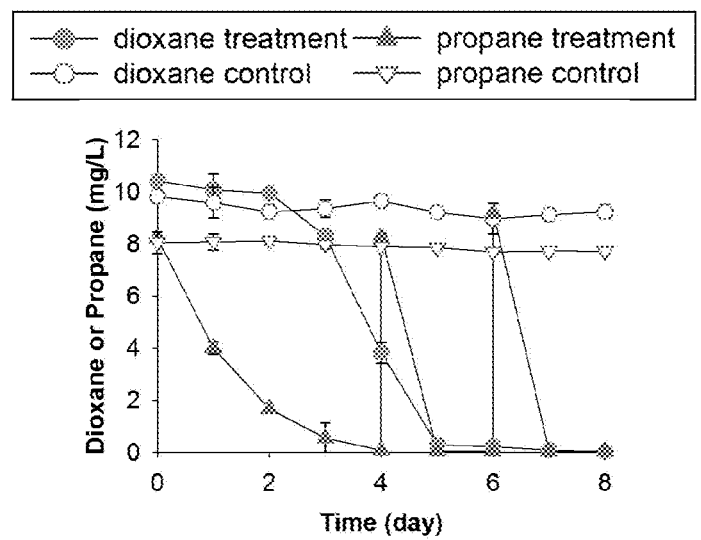

Microcosm assays mimicking bioaugmentation of DD4 using contaminated groundwater samples. Three groundwater samples were collected from the source zone area of a dioxane-impacted site located in southern California. Three samples of equal volumetric portion (1:1:1) were pooled to make one mixed sample. Microcosms were prepared in 150-mL serum bottles with 20 mL of mixed groundwater inoculated with DD4 (1.25 μg total protein/mL as the initial biomass concentration). Propane was injected with an initial concentration of 20 μM and amended when it was fully depleted. The bottles were sealed with rubber stoppers and crimped by aluminum caps. To examine the inhibitory effects of co-occurring contaminants (e.g., 1,1-DCE) and other factors, a parallel treatment was prepared with NMS medium spiked with 10 mg/L dioxane. Abiotic controls for both treatments were conducted using killed DD4 cells. All treatments were triplicated. With reference to FIGS. 4a and 4b, amendment of DD4 enabled the removal of dioxane after growth with propane as the primary substrate in the field samples collected from a dioxane-impacted site. No significant dioxane or propane removal was observed in the killed control. In contrast with the treatment with NMS, a lag phase of 1 day was observed for the initial consumption of propane, which subsequently decelerated the cometabolic degradation of dioxane. Without being confined to a single theory, such lag phase was probably caused by the inhibition of the co-occurring contaminants (e.g., 1,1-DCE) and other environmental factors. Despite the short lag phase, dioxane concentration was decreased from 10.1±0.5 to 0.2±0.1 mg/L on day 7 and below the MDL of the applied GC-FID method (i.e., 0.1 mg/L) on day 8. Samples collected on day 8 were pooled and re-examined using GC/MS, revealing a dioxane concentration of approximately 23 μg/L. Without further amendment of propane after day 8, monitoring results demonstrated that DD4 continued degrading dioxane with the concentration decreased to 0.75±0.03 μg/L on day 10, 0.44±0.02 μg/L on day 12, and below the MDL (i.e., 0.38 μg/L) on day 14, implying DD4 is also capable of mitigating dioxane in the low concentration range (i.e., parts per billion levels) prevailing at impacted sites in the United States. This microcosm assay indicated that cometabolic bioremediation with DD4 not only can handle heavy dioxane contamination commonly found near the source zone but also enables the elimination of dioxane below cleanup standards legislated in a number of states in the United States (e.g., 0.4 μg/L for New Jersey and 1 μg/L for California). Therefore, DD4 can not only overcome concurrent environmental inhibitors but also commence dioxane degradation to achieve stringent cleanup goals.

Figure 5A:
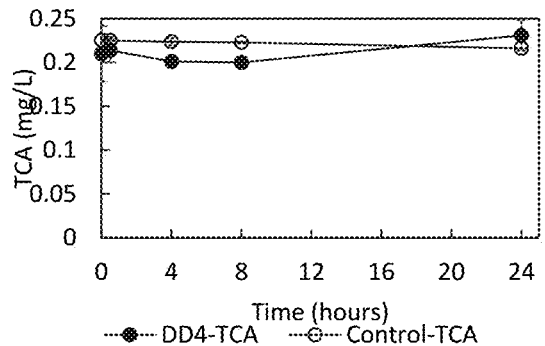
FIGS. 5a-5f are graphical depictions of biodegradation of selected CAHs by resting cells of DD4 after being fed with propane in accordance with one or more embodiments of the present disclosure.
Figure 5B:
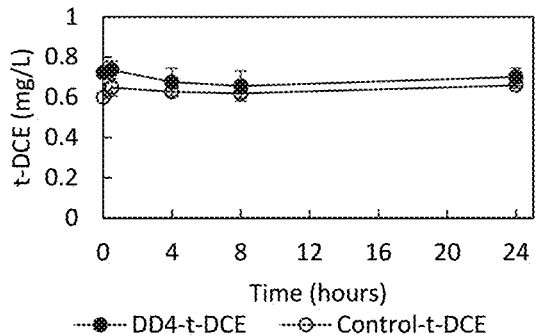
Figure 5C:
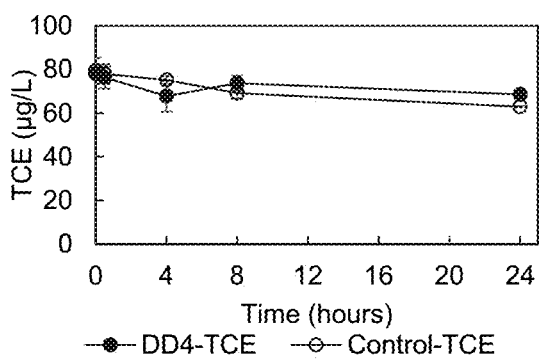
Figure 5D:
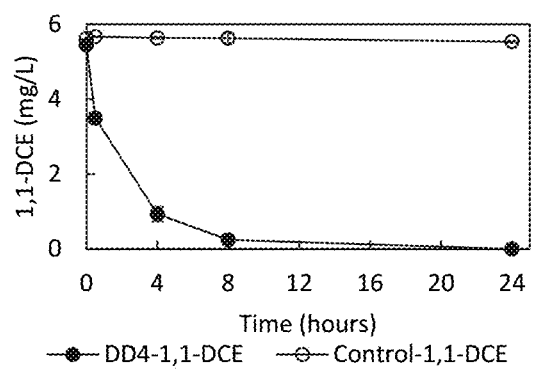
Figure 5E:
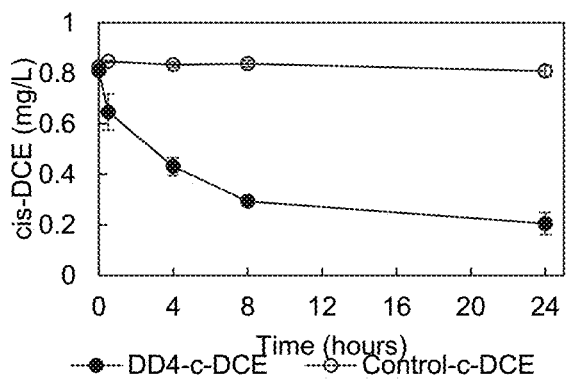
Figure 5F:
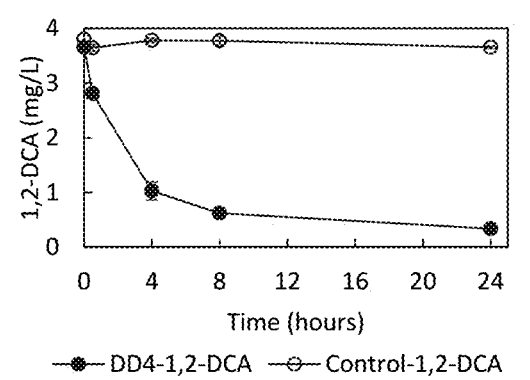

Cometabolism of CAHs by *Azoarcus* sp. DD4. The ability of strain DD4 to co-metabolize CAHs was evaluated after being fed with propane. DD4 cells were grown on propane in NMS at 30° C. while shaking at 150 rpm. Five mL of DD4 culture containing biomass equivalent of 0.13 mg protein $mL^{-1}$ was amended in 35-mL serum vials sealed with rubber stoppers and aluminum crimp caps. The CAHs 1,1,1-TCA, TCE, cis-DCE, trans-DCE, 1,2-DCA, and 1,1-DCE were added at the initial aqueous concentrations of 0.21±0.03 mg/L, 78.0±2.0 μg/L, 0.81±0.02 mg/L, 0.72±0.05 mg/L, 3.66±0.08 mg/L and 5.5±0.1 mg/L, respectively. At specific sampling intervals for 24 h, 100 μL of the headspace was sampled and analyzed by GC for monitoring the disappearance of CAHs. All degradation experiments were conducted in triplicate. Control treatments were prepared with DD4 cells killed by autoclave. With reference to FIGS. 5d-5f, the results with resting cells proved that DD4 is able to cometabolize 1,1-DCE, cis-DCE, and 1,2-DCA after growth with propane. However, no degradation of TCA, TCE, or trans-DCE was observed (FIG. 5a-5c). Compared to other CAHs, 1,1-DCE is known as a very potent inhibitor to bacterial enzymes that are involved in dioxane degradation. Previous studies showed that exposure of 1,1-DCE can significantly prohibit dioxane degradation by the archetypic degrader, Psuedonocardia dioxanivorans CB1190. However, DD4 can surprisingly cometabolize both dioxane and 1,1-DCE.

Figure 6A:
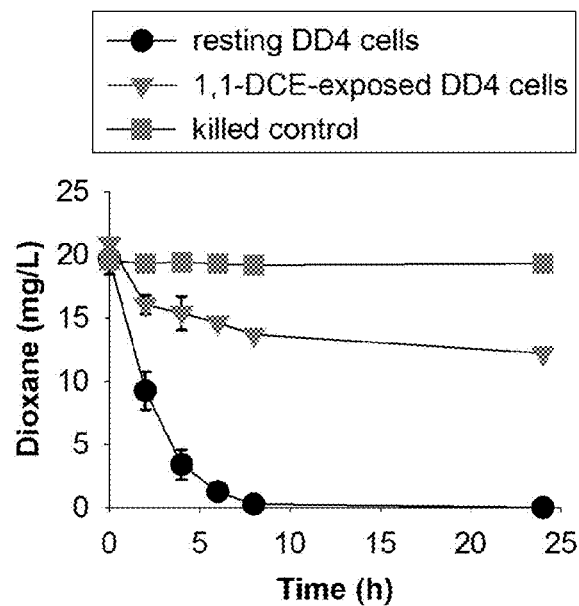
FIGS. 6a and 6b are graphical depictions of inhibition efforts of 1,1-DCE on dioxane biodegradation (FIG. 6a) and dioxane on 1,1-DCE biodegradation (FIG. 6b) in accordance with one or more embodiments of the present disclosure.
Figure 6B:
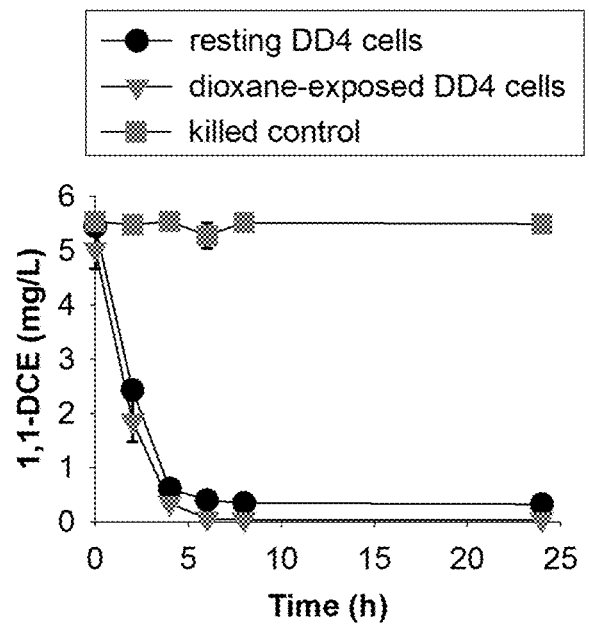

Inhibition of 1,1-DCE on dioxane degradation by *Azoarcus* sp. DD4. Though DD4 can degrade both dioxane and 1,1-DCE, the effect(s) of 1,1-DCE on dioxane biodegradation was investigated. DD4 cells were harvested at the exponential growth phase and washed by NMS medium three times. Three treatments were prepared with the resting cells by the exposure of dioxane (19.7±1.2 mg/L), 1,1-DCE (5.5±0.1 mg/L), and both dioxane (20.9±0.3 mg/L) and 1,1-DCE (5.0±0.4 mg/L). Concentrations of 1,1-DCE and dioxane were monitored using GC at selected time intervals over 24 hr. Abiotic controls were treated identically. All experiments were performed in duplicate vials. With reference to FIG. 6a, dioxane degradation by the resting cells was greatly inhibited by the presence of 1,1-DCE. In contrast, with reference to FIG. 6b, no inhibitory effects of dioxane on 1,1-DCE degradation were observed. Thus, it is very plausible that DD4 can resume its capability of degrading dioxane once 1,1-DCE is depleted by DD4.

Figure 7A:
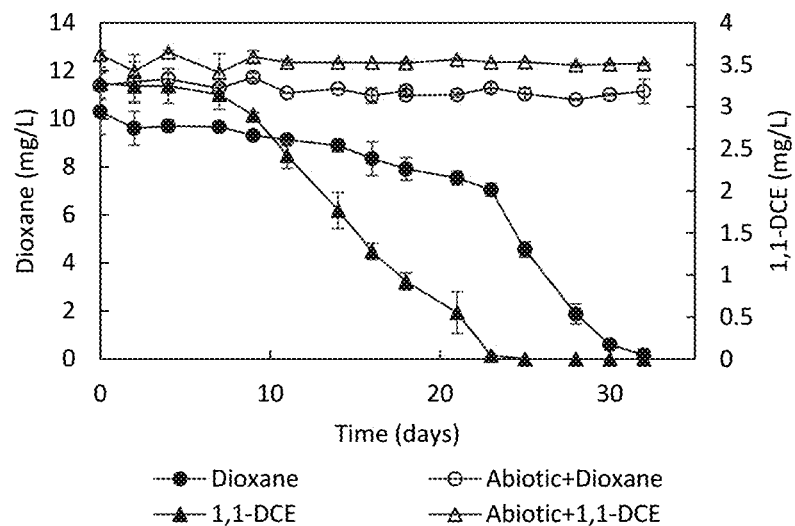
FIGS. 7a and 7b are graphical depictions of biodegradation of dioxane and 1,1-DCE when fed with propane (FIGS. 7a) and 1-propanol (FIG. 7b) in accordance with one or more embodiments of the present disclosure.
Figure 7B:
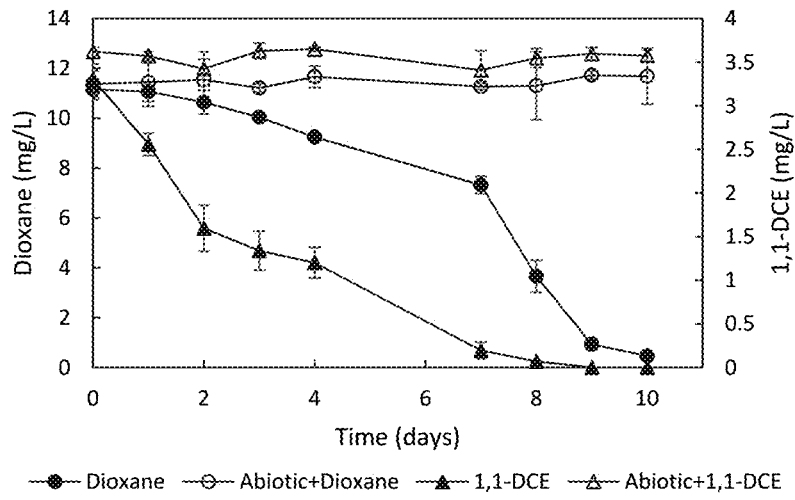

Biodegradation of concurrent dioxane and 1,1-DCE by *Azoarcus* sp. DD4. To evaluate the performance of DD4 in removing dioxane and 1,1-DCE when both compounds are concurrently present, microcosms were prepared with DD4 inoculum in NMS medium and dosed with dioxane and 1,1-DCE. Two primary substrates were used, including propane and 1-propanol. With reference to FIG. 7a, the presence of 1,1-DCE significantly inhibited the degradation of dioxane and consumption of propane for growth. An accelerated dioxane degradation was observed until 1,1-DCE was fully degraded on Day 23, suggesting activity of DD4 can be recovered after the removal of the inhibiting 1,1-DCE. 1-Propanol was further used as the primary substrate, as shown in FIG. 7b. The presence of 1,1-DCE and dioxane did not inhibit the utilization of 1-propanol and subsequent proliferation of DD4. Referring to FIGS. 7a and b, degradation of both 1,1-DCE and dioxane was approximately three times faster with 1-propanol compared to the treatment fed with propane. Similarly, dioxane degradation was significantly accelerated when 1,1-DCE was removed by DD4. The results suggest 1-propanol could be an acceptable or possibly superior auxiliary substrate for in situ bioaugmentation of DD4.

Figure 8A:
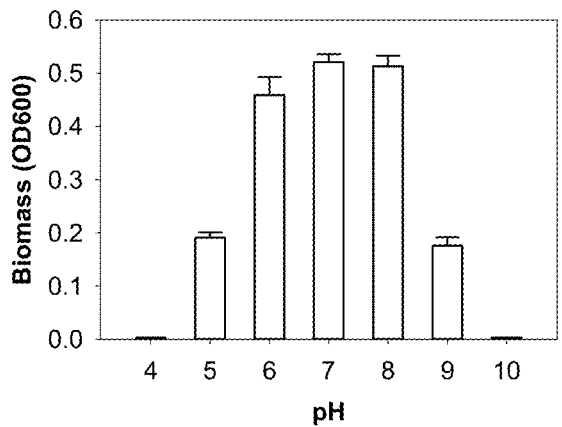
FIGS. 8a-8c are graphical depictions of growth of DD4 at pH 4.0 to 10.0 (FIGS. 8a, 0% to 3.5% of NaCl (FIG. 8b), and temperature of 10° C. to 45° C.
Figure 8B:
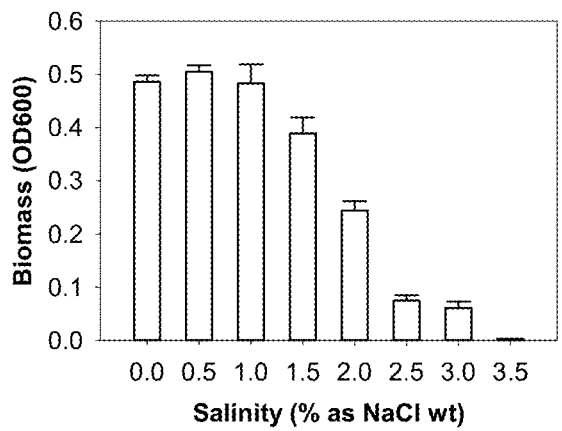
Figure 8C:
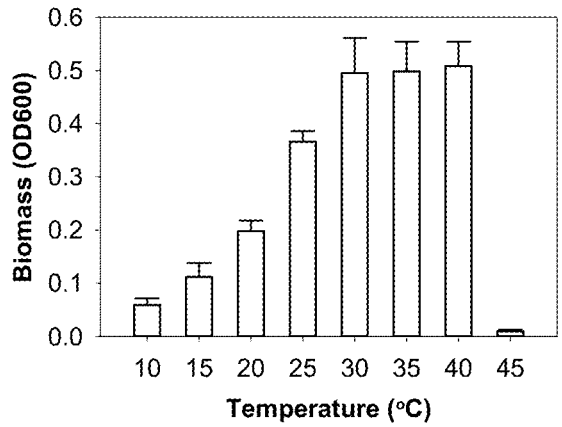

DD4's adaptability to pH, salinity and temperature. To identify its optimum growth conditions, DD4 was cultured with propane as the substrate under different pHs, temperatures, and salinities. The pHs of NMS medium were adjusted to 4.0, 5.0, 6.0, 7.0, 8.0, 9.0 and 10.0 with appropriate amount of 1 M HCl or 1 M NaOH. The NMS mediums were cultured under 10° C., 15° C., 20° C., 25° C., 30° C., 35° C., and 40° C. The salinities of NMS medium were adjusted to 0%, 0.5%, 1.0%, 1.5%, 2.0%, 2.5%, 3.0%, and 3.5% (w/v) with NaCl. 6 mL of propane (equivalent to 6% of the head space volume) was injected into the sealed bottles in all these assays. DD4 was inoculated at the initial concentration of 0.05 measured as OD600 and cultured under 30° C., 150 rpm for 72 h while shaking. The optical density (OD) values of bacterial suspensions were determined with spectrophotometer under 600 nm. Effects of initial pH, incubation temperature, and saline concentration on DD4 were evaluated based on the cell growth, as shown in FIGS. 8a, 8b, and 8c. The optimal growth parameters for DD4 include pH 7.0, NaCl 0-1%, and temperature of 30-40° C. DD4 could survive and maintain its growth and cometabolic activity toward dioxane under pH of 5.0-9.0, temperature of 10-45° C., and NaCl concentration of 0.0-3.0%. A relatively wide adaptability range of conditions suggest that DD4 has a promising applicability for in situ remediation of contaminated groundwater and soils of varying geographical conditions.

Figure 9A:
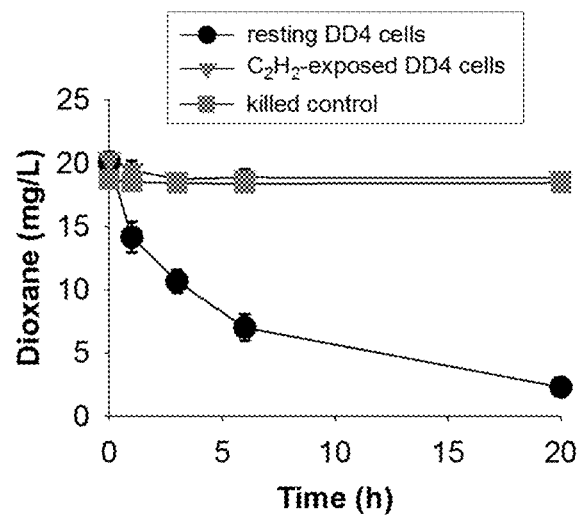
FIGS. 9a, 9b, and 9c are graphical depictions of inhibition of acetylene to biodegradation of dioxane (FIG. 9a), 1,1-DCE (FIG. 9b), and propane (FIG. 9c) in accordance with one or more embodiments of the present disclosure.
Figure 9B:
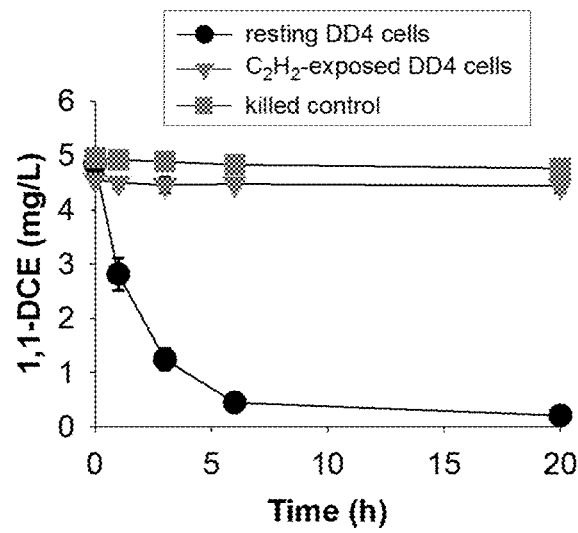
Figure 9C:
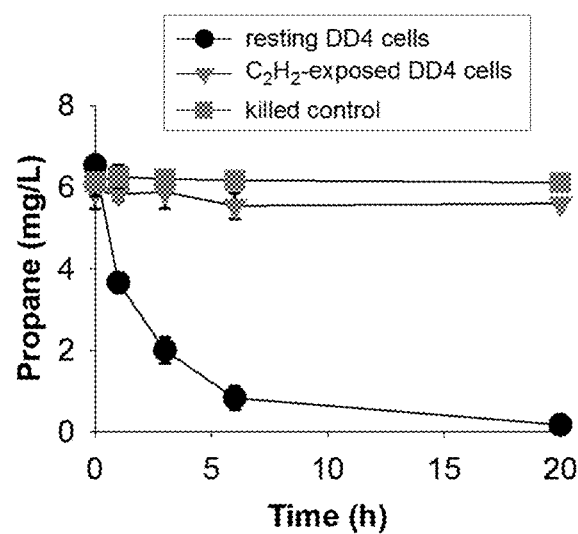

Inhibition of dioxane, 1,1-DCE, and propane degradation by acetylene. Acetylene is an irreversible suicide substrate that inactivates bacterial monooxygenases (MOs). Prior S. and Dalton H, 1985. Acetylene as a suicide substrate and active site probe for methane monooxygenase from *Methylococcus capsulatus* (Bath). FEMS Microbiology Letters. 29, 105-109. To demonstrate the involvement of MOs in propane and dioxane degradation by DD4, an inhibition assay was conducted using DD4 resting cells. After being washed with NMS three times, resting cells were pre-incubated with acetylene (10% headspace volume) for 20 minutes prior to the amendment of dioxane, 1,1-DCE, or propane. The effect of the inhibitor acetylene was studied by monitoring the depletion of dioxane, 1,1-DCE, and propane over time in the presence or absence of acetylene. Duplicate abiotic controls were prepared in parallel. The propane and dioxane depletion were monitored over time by GC analysis. With reference to FIGS. 9a, 9b, and 9c, degradation of propane, 1,1-DCE, and dioxane were both completely prohibited by the exposure to acetylene, suggesting MOs are in charge of degradation of all three compounds.

Figure 10:
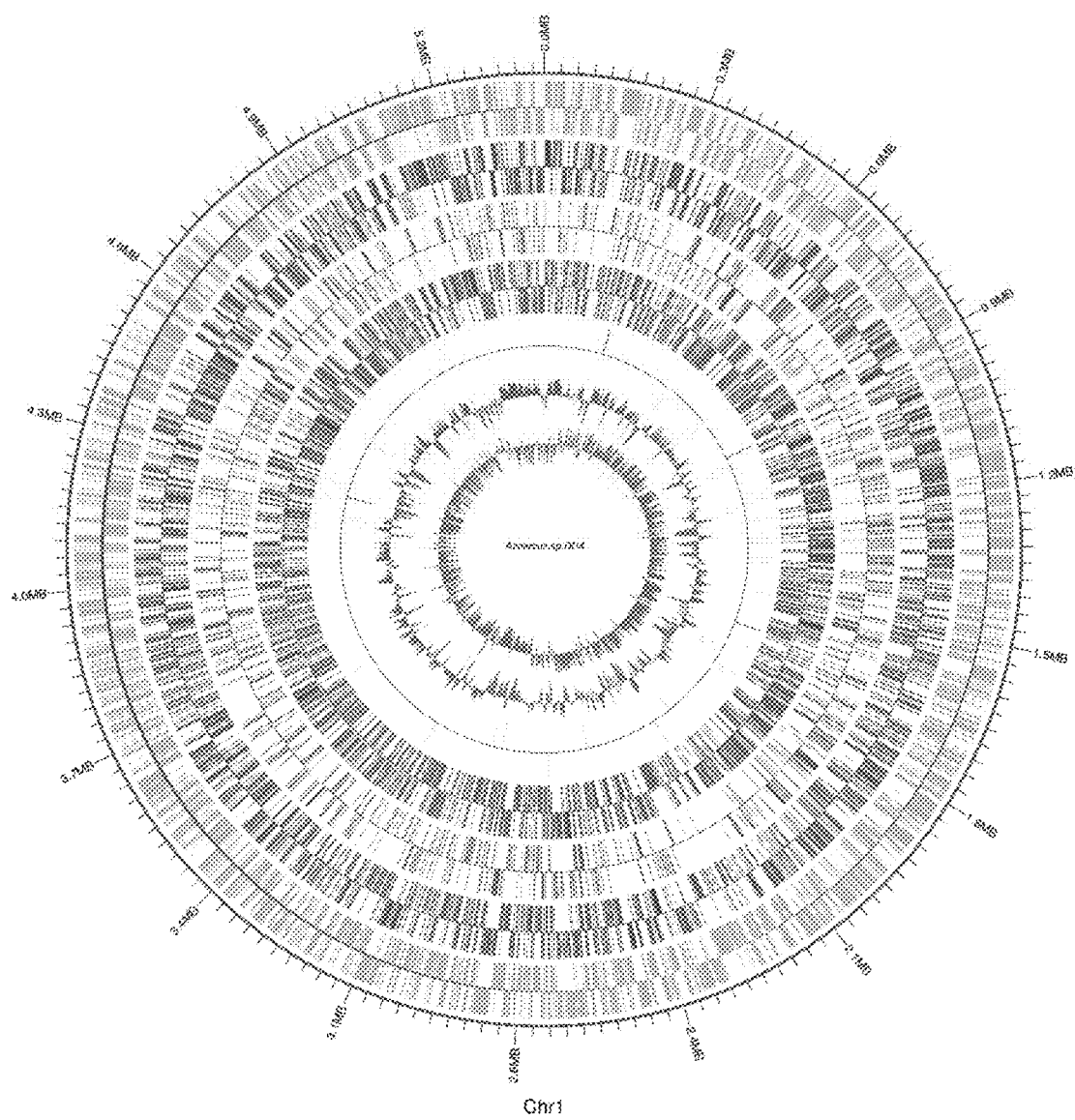
FIG. 10 is a genome map of the single chromosome of DD4.

Genome sequencing and annotation of *Azoarcus* sp. DD4. Total genomic DNA of DD4 was extracted using the MagAttract HMW DNA Kit (Qiagen, Hilden, Germany) according to the manufacturer's instructions. The genome of DD4 was sequenced by the Pacbio Sequel™ System (Menlo Park, Calif.). For genome component prediction, the GeneMarkS program (Besemer, J., et al (2001). GeneMarkS: a self-training method for prediction of gene starts in microbial genomes. Implications for finding sequence motifs in regulatory regions. Nucleic Acids Research 29(12), 2607-2618) was employed to retrieve the related coding genes. Seven databases were then used for annotation of gene functions and the whole genome Blast search (e-value less than 1e-5, minimal alignment length percentage larger than 40%)(Altschul, S. F. et al. (1990). Basic local alignment search tool. Journal of Molecular Biology 215(3), 403-410) including Gene Ontology (Ashburner, M. et al. (2000). Gene Ontology: tool for the unification of biology. Nature Genetics 25(1), 25), KEGG (Kyoto Encyclopedia of Genes and Genomes)(Kanehisa, M. et al. (2006). From genomics to chemical genomics: new developments in KEGG. Nucleic Acids Research 34(suppl_1), D354-D357); (Kanehisa, M. et al. (2011). KEGG for integration and interpretation of large-scale molecular data sets. Nucleic Acids Research 40(D1), D109-D114), COG (Clusters of Orthologous Groups) Tatusov, R. L. et al. (2003). The COG database: an updated version includes eukaryotes. BMC bioinformatics 4(1), 41), NR (Non-Redundant Protein Database databases)(Li, W. et al. (2002). Tolerating some redundancy significantly speeds up clustering of large protein databases. Bioinformatics 18(1), 77-82), TCDB (Transporter Classification Database) (Saier Jr, M. H. et al. (2013). The transporter classification database. Nucleic Acids Research 42(D1), D251-D258), Swiss-Prot and TrEMBL (Boeckmann, B. et al. The SWISS-PROT protein knowledgebase and its supplement TrEMBL 2003. Nucleic Acids Research 31(1), 365-370; Consortium, U. (2014). UniProt: a hub for protein information. Nucleic Acids Research, gku989). The genome size of DD4 is 5.4 Mbp, consisting of 4974 genes that cover approximately 90.1% of the genome, as illustrated in FIG. 10. There exist no plasmids or other mobile elements in DD4. The genome of DD4 contains 78 tRNA genes and 4 rRNA gene clusters (5S, 16S, and 23S). Notably, four gene clusters encoding the soluble di-iron monooxygenases (SDIMOs) (Leahy, J. G. et al. (2003). Evolution of the soluble diiron monooxygenases. Fems Microbiology Reviews 27(4), 449-479; Notomista, E. et al. (2003). Evolution of bacterial and archaeal multicomponent monooxygenases. J Mol Evol 56(4), 435-445) are found in the chromosome, including a group-1 phenol hydroxylase, a group-2 toluene monooxygenase, a group-3 butane monooxygenase, and a group-5 propane monooxygenase, as shown in Table 2. In addition, genes encoding a copper membrane particulate monooxygenase and a cytochrome P450 CYP153 alkane hydroxylase are identified.

TABLE 2

Sequence analysis of four SDIMOs and one particulate MO in DD4

| ORF name | Gene & protein size (bp/kDa) | Best GeneBank match | Access No. | Amino acid identity |
|---|---|---|---|---|
| Group 1 Phenol Hydroxylase | | | | |
| DmpO | 357/13.1 | phenol hydroxylase *Azoarcus* sp. BH72 | WP_011765582 | 115/118 (97%) |
| DmpN | 1518/58.7 | phenol 2-monooxygenase *A. olearius* DQ4 | WP_065340349 | 505/505 (100%) |
| DmpM | 270/10.1 | MULTISPECIES: monooxygenase [*Azoarcus*] | WP_011765580 | 89/89 (100%) |
| DmpL | 993/37.2 | phenol hydroxylase *A. olearius* DQ4 | WP_065340348 | 330/330 (100%) |

TABLE 2-continued

Sequence analysis of four SDIMOs and one particulate MO in DD4

| ORF name | Gene & protein size (bp/kDa) | Best GeneBank match | Access No. | Amino acid identity |
|---|---|---|---|---|
| DmpK | 261/9.8 | phenol hydroxylase *A. olearius* DQ4 | WP_065340347 | 86/86 (100%) |
| Group 2 Toluene MO | | | | |
| TmoA | 1506/57.5 | Aromatic and Alkene Monooxygenase Hydroxylase, subunit A, *Thauera* sp. 27 | WP_002940952 | 492/501 (98%) |
| TmoB | 261/9.6 | T4MO system B, *Thauera* sp. 27 | WP_002940949 | 81/86 (94%) |
| TmoC | 336/12.1 | T4MO effector protein complex, Rieske ferredoxin subunit, *Thauera* sp. 27 | WP_002940947 | 103/111 (93%) |
| TmoD | 423/15.7 | monooxygenase component MmoB/DmpM, *Thauera* sp. 27 | WP_002940945 | 98/104 (94%) |
| TmoE | 987/37.8 | Aromatic and Alkene Monooxygenase ydroxylase, subunit B, *Thauera* sp. 27 | WP_002940943 | 308/328 (94%) |
| TmoF | 1020/36.9 | ferredoxin:oxidoreductase FAD/NAD(P) binding *Thauera* sp. 27 | WP_002940942 | 286/339 (84%) |
| Group 5 Propane MO | | | | |
| PrmA | 1671/64.7 | Aromatic and Alkene Monooxygenase Hydroxylase, subunit A, *Azoarcus* | WP_011764952 | 544/556 (98%) |
| PrmD | 1044/38.6 | CDP-6-deoxy-delta-3,4-glucoseen reductase, *Azoarcus* | WP_011764953 | 331/347 (95%) |
| PrmB | 1092/41.1 | toluene hydroxylase, *Azoarcus olearius* | WP_065339987 | 344/363 (95%) |
| PrmC | 357/13.3 | phenol 2-monooxygenase, *Azoarcus* | WP_011764955 | 112/118 (95%) |
| GroEL | 1638/57.3 | molecular chaperone GroEL, *Azoarcus olearius* | WP_065339988 | 510/544 (94%) |
| Group 3 Butane MO | | | | |
| BmoZ | 390/14.7 | Methane monooxygenase, hydrolase gamma chain, *Thauera butanivoran* butane monooxygenase gamma subunit, *Brachymonas petroleovorans* | WP_068635400 AAR98537 | 99/128 (77%) 101/128 (79%) |
| BmoB | 417/15.4 | butane monooxygenase regulatory protein, *Brachymonas petroleovorans*; | AAR98536 | 115/138 (83%) |
| BmoY | 1188/45.1 | butane monooxygenase beta subunit, *Brachymonas petroleovorans* | AAR98535 | 322/391 (82%) |
| BmoX | 1596/60.8 | butane monooxygenase alpha subunit, *Brachymonas petroleovorans* | AAR98534 | 495/530 (93%) |
| Particulate MO | | | | |
| PmoC | 501/19.3 | methane monooxygenase/ammonia monooxygenase subunit C, *Bradyrhizobium* sp. NAS96.2, root nodule | OKO66869 | 128/164 (78%) |
| PmoA | 735/28.1 | hypothetical protein, *Bradyrhizobium* sp. NAS96.2 | WP_074132569 | 169/245 (69%) |
| PmoB | 1134/41.3 | methane monooxygenase/ammonia monooxygenase subunit B, *Bradyrhizobium* sp. NAS96.2 | WP_074132570 | 232/377 (62%) |

Knockout mutation of the prm gene in *Azoarcus* sp. DD4. It was reported that the group-5 SDIMO genes in Pseudonocardia and *Rhodococcus* species are responsible for the function of dioxane degradation. A prmADBC gene cluster in DD4 was identified in the genome of DD4 as a potential candidate for the initial oxidation of propane and dioxane. To verify this postulation, the prm gene cluster was genetically knocked out. The mutant (designated as Δprm) was constructed by the in-frame deletion of a gene cluster. To delete this prmADBC gene cluster, the 0.9 kb upstream region of prmA was amplified by oligonucleotides AZD_F1.1 (SEQ ID NO 1) and Upflank_R (SEQ ID NO 2) having BamHI and HindIII sites at their respective 5-ends, and the fragment cloned into BamHI-HindIII sites of pBBR1MCS-2 resulting plasmid pPRM_UP. Similarly, the 0.9 kb downstream region of prmBC was amplified (using primers Downflank_F (SEQ ID NO 3) and Downflank_R (SEQ ID NO 4)) and cloned into HindIII and KpnI sites of pPRM_UP to generate pPRMUD containing the deletion. The insert was further subcloned into BamHI-KpnI sites of pK18mobsacB to generate pPRMUD-M. Plasmid pPRMUD-M was transferred to wild-type *Azoarcus* sp. DD4 by triparental conjugation with the helper strain *E. coli* (pRK2013). Individual single recombinants were further selected for double recombination on VM-Ethanol agar plates containing 6% sucrose. Strains showing deletions of prmADBC gene cluster were distinguished from the wild type by colony PCR. Sequences of primers used are listed below:

```
AZD_F1.1:
                                       (SEQ ID NO 1)
5'-AGATATAGGATCCATGACTGCTGGATTGACACTCAACAAGATCAC-
3'

Upflank_R:
                                       (SEQ ID NO 2)
5'-AGATATAAAGCTTGGTGCGGTAGTAGTCCTCGTAGATCCAGC-3'

Downflank_F:
                                       (SEQ ID NO 3)
5'-AGATATAAAGCTTCGAGTTCGGCCTGGGCATGG-3'

Downflank_R:
                                       (SEQ ID NO 4)
5'-AGATATAGGTACCGGATCATCGCGGGCAGGTAGG-3'
```

Figure 11A:
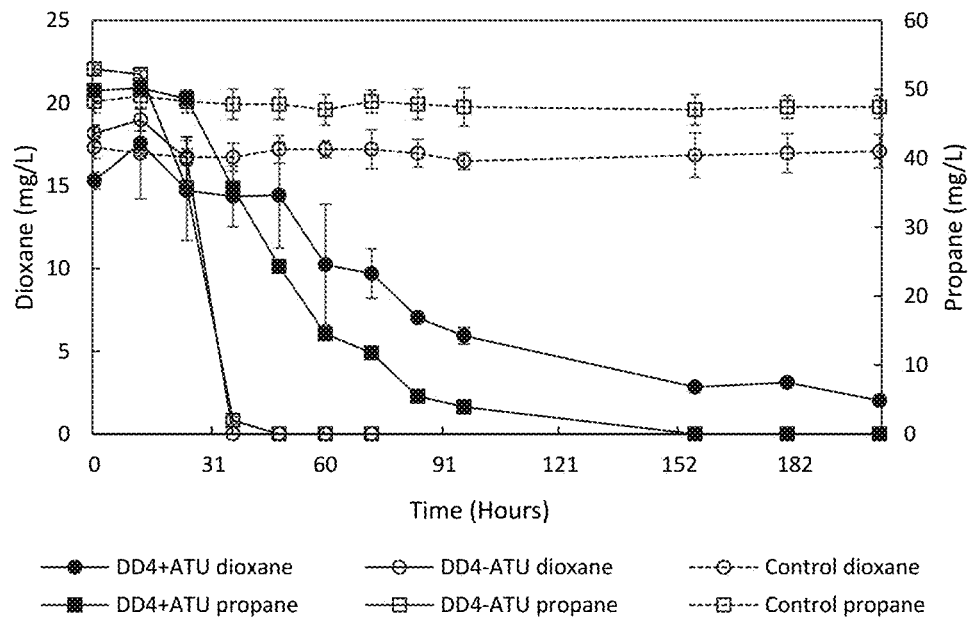
FIGS. 11a and 11b are graphical depictions of degradation of propane and dioxane by wildtype DD4 (FIG. 11a) and prm-deleted DD4 mutant (FIG. 11b) with or without ATU as an inhibition compound to particulate monooxygenases in accordance with one or more embodiments of the present disclosure.
Figure 11B:
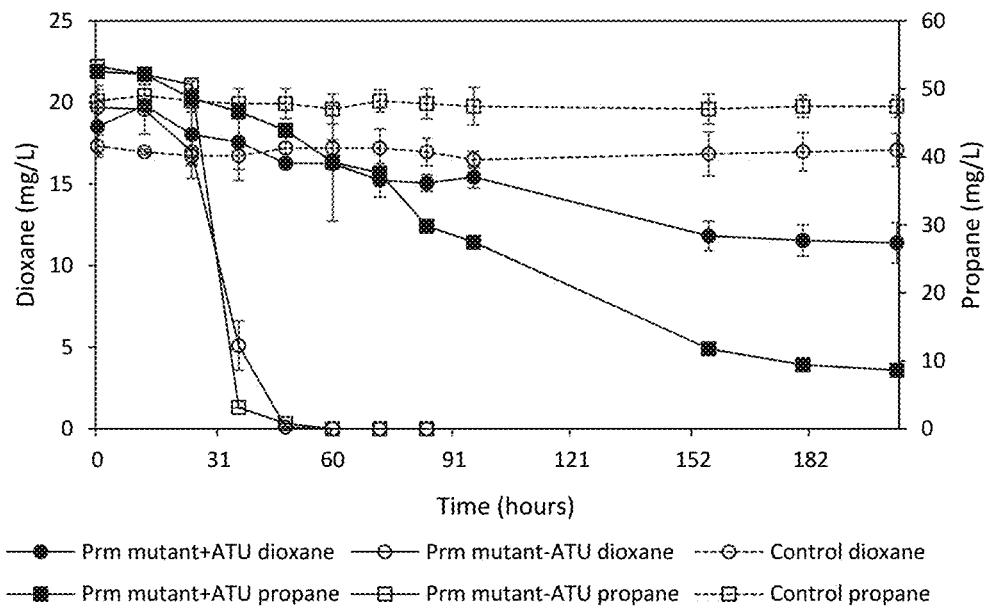

Allylthiourea (ATU) was reported to inhibit the particulate MOs involved in nitrification and alkane degradation in various bacteria. To exploit the effects of prm-deletion on the propane and dioxane degradation and further to distinguish the soluble versus particulate MO category the DD4 dioxane degrader belongs to, the wild-type and prm-deleted DD4 strains were cultured with and without the presence of ATU using propane as a primary substrate to cometabolize dioxane. Duplicate abiotic controls were prepared in parallel. The propane and dioxane depletion were monitored over time by GC analysis. Now referring to FIGS. 11a and 11b, prmADBC is only partially correlated with the propane degradation but not associated with the dioxane cometabolism. At the same time, ATU can partially inhibit the propane consumption and thus prolonged dioxane degradation, suggesting the particulate MO may be partially involved in the propane oxidation.

Figure 12:
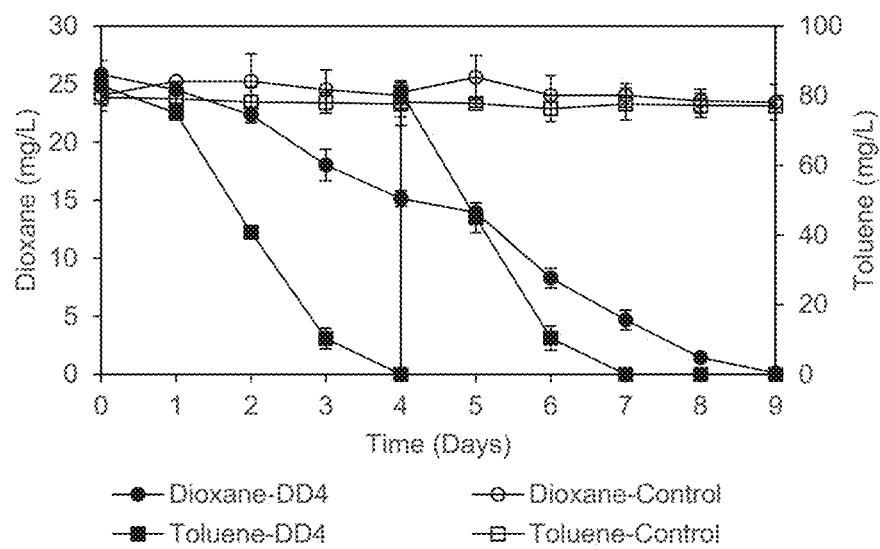
FIG. 12 is a graphical depiction of cometabolism of dioxane by DD4 when fed with toluene in accordance with one or more embodiments of the present disclosure.

Cometabolism of dioxane by *Azoarcus* sp. DD4 with toluene as the primary substrate. *Azoarcus* sp. DD4 can also metabolically degrade toluene as the sole carbon and energy source. To investigate the possibility of concurrent removal of dioxane and toluene, degradation of dioxane using toluene as a primary substrate was evaluated. The experimental approach was same as described above. The toluene and dioxane depletion were monitored over time by GC analysis. It was found that the growth of DD4 was significantly inhibited when toluene concentration was above 100 mg/L. Thus, toluene was initially spiked at the concentration of 82.9±2.9 mg/L, and 81.0±1.9 mg/L of toluene was sequentially added at day 4 when the initial toluene was depleted. Initial concentration of dioxane was 25.8±1.2 mg/L. With reference to FIG. 12, after 9 days of incubation, DD4 degraded dioxane to below the detection limit. Abiotic controls were prepared in parallel with no significant dioxane or toluene loss.

Knockout mutation of the tmo gene in *Azoarcus* sp. DD4. The role of MO in dioxane degradation by the acetylene inhibition test has been confirmed. Further, group-2 toluene MOs have been heterologously expressed in *E. coli* clones, which exhibited the dioxane oxidization activity in previous studies. With the previous mutation test precluding PRM in dioxane oxidation and recent finding that DD4 can use toluene as the primary substrate to cometabolize dioxane, it is postulated that the group-2 toluene MO (TMO) of DD4 might be the enzyme that cometabolizes dioxane. To verify the function of TMO, a knock-out mutant for tmoABCDEF (designated as Δtmo) was constructed by in-frame deletion of the gene cluster as mentioned above. To delete the tmoABCDEF gene cluster, the 1.0 kb upstream region of tmoA was amplified by oligonucleotides KOTMO_UF (SEQ ID NO 5) and KOTMO_UR (SEQ ID NO 6) having HindIII and EcoRI sites at their respective 5-ends, and the fragment was cloned into HindIII-EcoRI sites of pBBR1MCS-2 resulting in the plasmid pTMO_UP. Similarly, the 0.8 kb downstream region of tmoF was amplified (KOTMO_DF (SEQ ID NO 7) and KOTMO_DR (SEQ ID NO 8)) and cloned into EcoRI and BamHI sites of pTMO_UP to generate pTMOUD containing the deletion. The insert was further subcloned into HindIII-BamHI sites of pK18mobsacB to generate pTMOUD-M. Plasmid pTMOUD-M was transferred to the wildtype *Azoarcus* sp. DD4 by triparental conjugation with the helper strain *E. coli* (pRK2013). Individual single recombinants were further selected for double recombination on VM-Ethanol agar plates containing 6% sucrose. Strains showing deletions of tmo gene cluster were distinguished from the wild type by colony PCR. Sequences of primers used are listed below:

```
KOTMO_UF:
                                       (SEQ ID NO 5)
5'-AGATATAAAGCTTCATCTTCGAGAACGCCGACCC-3'

KOTMO_UR:
                                       (SEQ ID NO 6)
5'-AGATATAGAATTCCACATGTTGCAGACGTAGGGCAG-3'

KOTMO_DF:
                                       (SEQ ID NO 7)
5'-AGATATAGAATTCGAACGGCGACGACATCCTGG-3'

KOTMO_DR:
                                       (SEQ ID NO 8)
5'-AGATATAGGATCCTCCTGCATCAGGTTGTAGGTACGG-3'
```

Figure 13A:
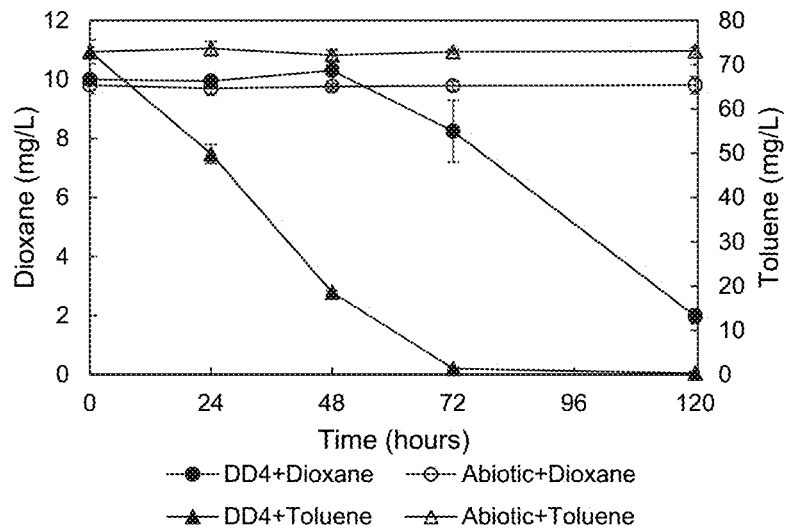
FIGS. 13a and 13b are graphical depictions of degradation of toluene and dioxane by wildtype DD4 (FIG. 13a) and tmo-deleted DD4 mutant (FIG. 13b) in accordance with one or more embodiments of the present disclosure.
Figure 13B:
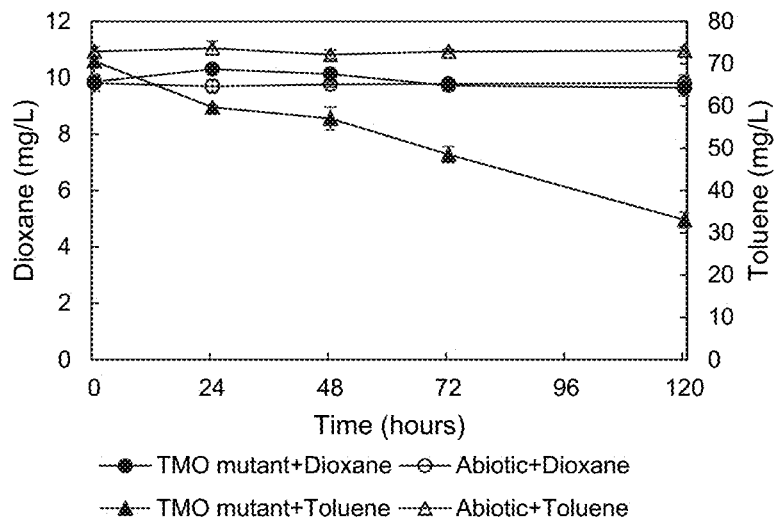
Figure 14A:
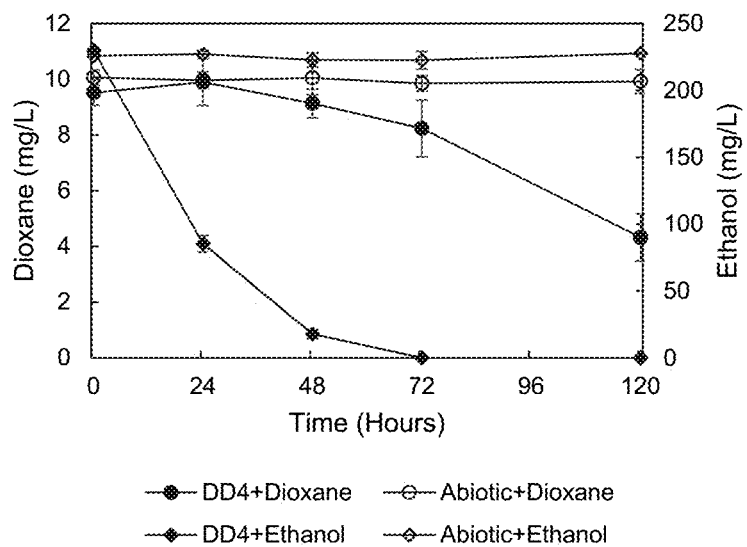
FIGS. 14a and 14b are graphical depictions of degradation of ethanol and dioxane by wildtype DD4 (FIG. 14a) and tmo-deleted DD4 mutant (FIG. 14b) in accordance with one or more embodiments of the present disclosure.
Figure 14B:
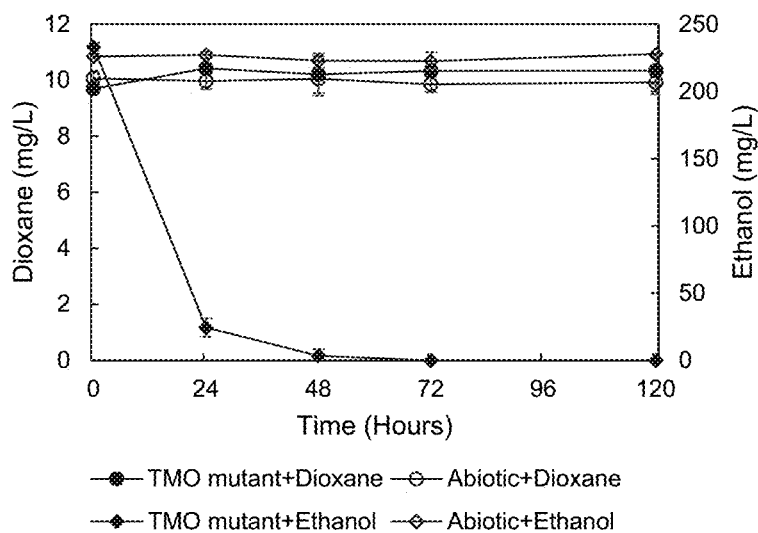

To verify the role of tmo-encoded enzyme in the toluene and dioxane degradation, the wildtype and tmo-deleted DD4 strains were cultured using toluene as the primary substrate. Duplicate abiotic controls were prepared in parallel. With reference to FIGS. 13a and 13b, the results showed that the tmo-encoded enzyme is only partially responsible for the toluene degradation, since the Δtmo mutant can still degrade toluene at a relatively slow pace compared to the wildtype DD4. Notably, the Δtmo mutant completely lost its ability to oxidize dioxane when grown with toluene. Such observation was further verified in treatments fed with ethanol, as shown in FIGS. 14a and 14b. The Δtmo mutant can use ethanol as the growth substrate, but no dioxane degradation was exhibited. These lines of evidence corroborate that the group-2 toluene MO in DD4 is the enzyme in charge of dioxane cometabolism in DD4.

Figure 15:
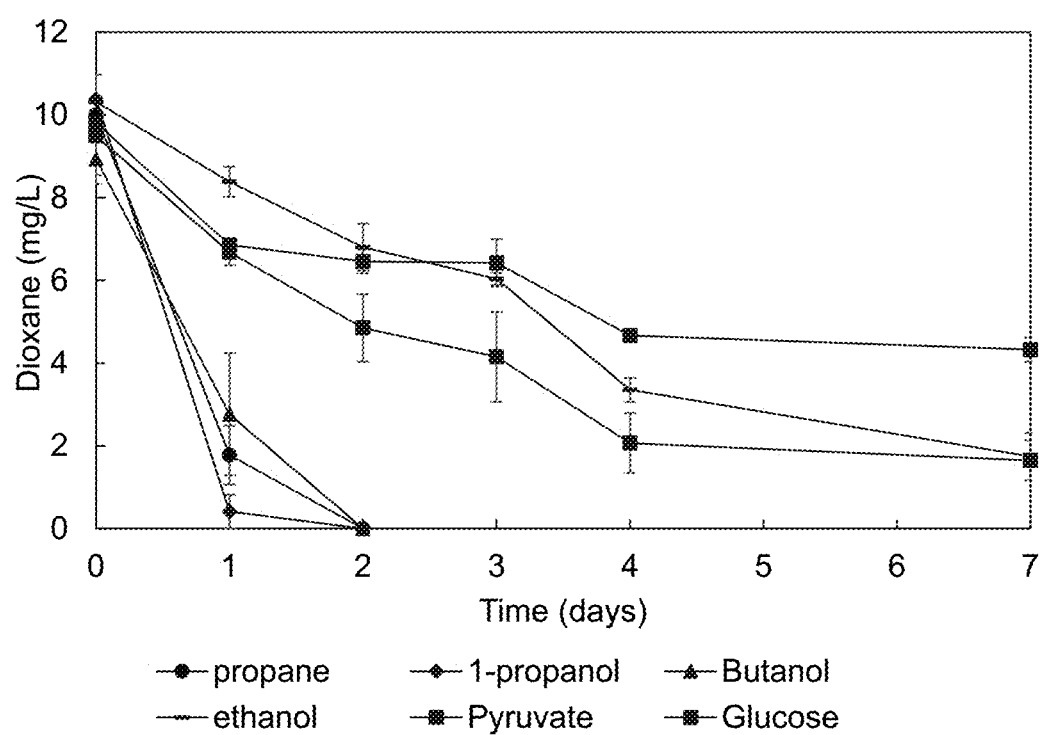
FIG. 15 is a graphical depiction of dioxane cometabolism by DD4 when fed with different substrates in accordance with one or more embodiments of the present disclosure.

Comparison of different auxiliary substrates for *Azoarcus* sp. DD4. To compare the effectiveness of different auxiliary substrates in dioxane cometabolism by DD4, DD4 was inoculated in NMS medium fed with the same amount (100 mg/L) of propane, 1-propanol, 1-butanol, ethanol, pyruvate, and glucose. To complete the dioxane removal, ethanol was further amended on Days 2 and 4. Pyruvate and glucose were amended on Day 3. As shown in FIG. 15, dioxane was degraded quickly within 2 days when DD4 was fed with propane, 1-propanol, and 1-butanol. However, ethanol, pyruvate, and glucose prolonged dioxane degradation, which, without being confined to a single theory, is probably associated with metabolic flux dilution and catabolic repression. Therefore, propane, 1-propanol, and 1-butanol are better auxiliary substrates for enhancing dioxane by DD4.

Bacterial Strain *Mycobacterium* sp. DT1

Figure 16:
FIG. 16 is a photographic image of *Mycobacterium* sp. DT1 grown on R2A agar in accordance with one or more embodiments of the present disclosure.
Figure 17:
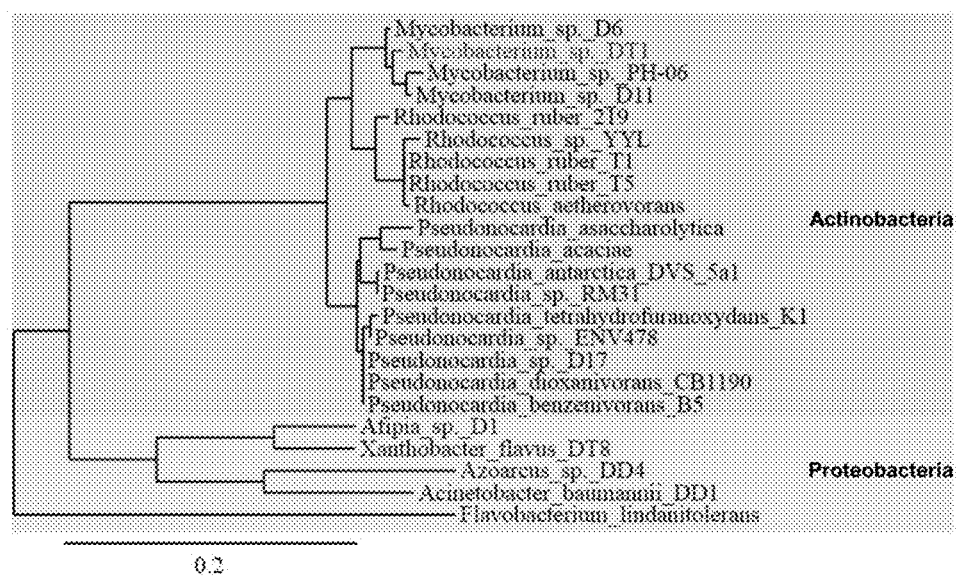
FIG. 17 is a depiction of a neighbor-joining tree showing the phylogenetic relationships of *Mycobacterium* sp. DT1 and dioxane degrading bacteria, wherein the phylogenetic tree is based on the alignment of 16S rRNA genes in accordance with one or more embodiments of the present disclosure.

Isolation and identification of bacterial strain *Mycobacterium* sp. DT1. A sediment sample was obtained from Hackensack River in northern New Jersey. Prior to the enrichment, 2.0 g of sediment (wet weight) was washed three times with sterile phosphate buffer solution (PBS, 20 mM, pH 7.2) to remove dissolved natural organic carbon sources. The washed sample was suspended in 20 mL BSM in a 120-mL serum bottle supplemented with dioxane, TCE and appropriate amount of propane as carbon sources, and incubated on a rotary shaker at 160 rpm and 30° C. To suppress the growth of protozoa in the enrichment culture, the medium was amended with 10 mg/L cycloheximide. Bi-weekly 0.2 mL of the supernatant of the culture was transferred into 20 mL of fresh BSM for further enrichment. Degradation of propane, TCE and dioxane was monitored during the enrichment. After two months of incubation, the final enrichment culture exhibiting fast propane, TCE, and dioxane removal rates was diluted and plated onto R2A agar plates. After incubation at 30° C. for three days, morphologically distinct colonies were obtained. Individual colonies were transferred to 20 mL of BSM amended with propane, TCE and dioxane to verify dioxane and TCE co-metabolism. A bacterial strain grown on propane and co-metabolizing dioxane and TCE was selected for further study. With reference to FIGS. 16 and 17, the selected isolate was identified by physiological and biochemical tests, and by 16S rRNA gene sequencing analysis, and designated as *Mycobacterium* sp. DT1.

Figure 18:
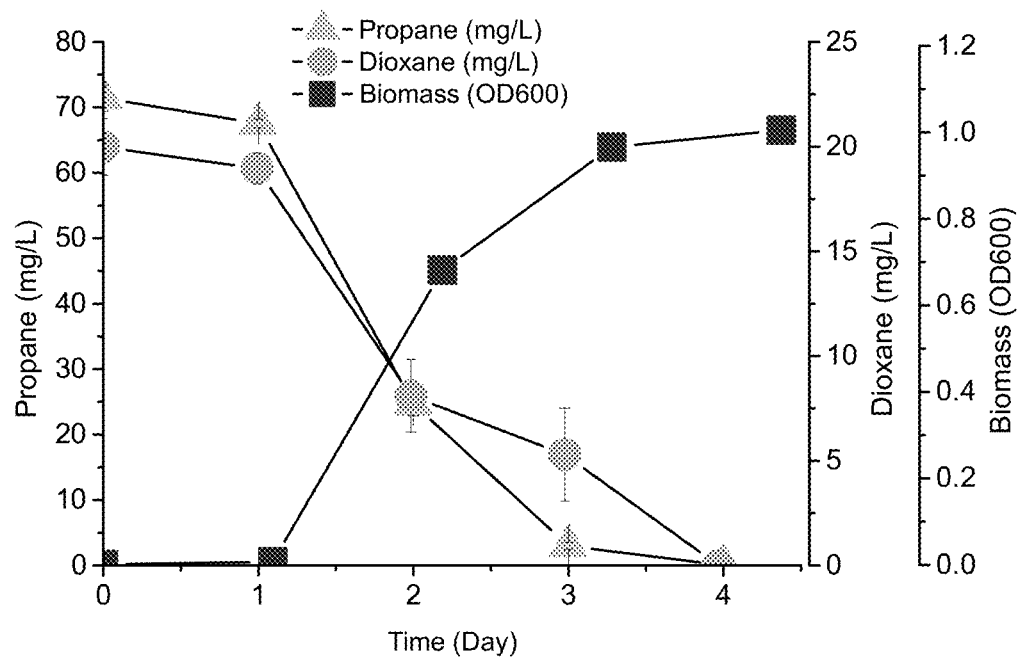
FIG. 18 is a graphical depiction of dioxane degradation and biomass accumulation of *Mycobacterium* sp. DT1 using propane as the sole carbon and energy source in accordance with one or more embodiments of the present disclosure.

Cometabolism of dioxane using propane as the primary substrate. The ability of strain DT1 to co-metabolize dioxane using propane as a primary substrate was evaluated with bench tests. DT1 cells were grown on propane in BSM spiked with 0.1% Tween-80 at 30° C. while shaking at 150 rpm. Initial concentrations of 20.1±1.4 mg/L dioxane and 3.3% propane were added. The cultures were inoculated with DT1 at the initial biomass of 0.2 mg protein L$^{-1}$ in 150-mL serum vials sealed with rubber stoppers and aluminum crimp caps. The disappearance of propane and dioxane was monitored for 96 h. Aliquots (0.7 mL) were periodically sampled and filtered through a filter of 0.22 μm pore size. The filtrates were subjected to GC and GC-MS analysis. All degradation experiments were conducted in triplicate. Control treatments were prepared with DT1 cells killed by autoclave. With reference to FIG. 18, DT1 initially grew on propane and commenced the dioxane degradation without a lag time. At the incubation of 96 h, dioxane was removed from 20.1±1.4 mg/L to below the MDL of our GC-FID method (i.e., 0.1 mg/L).

Figure 19:
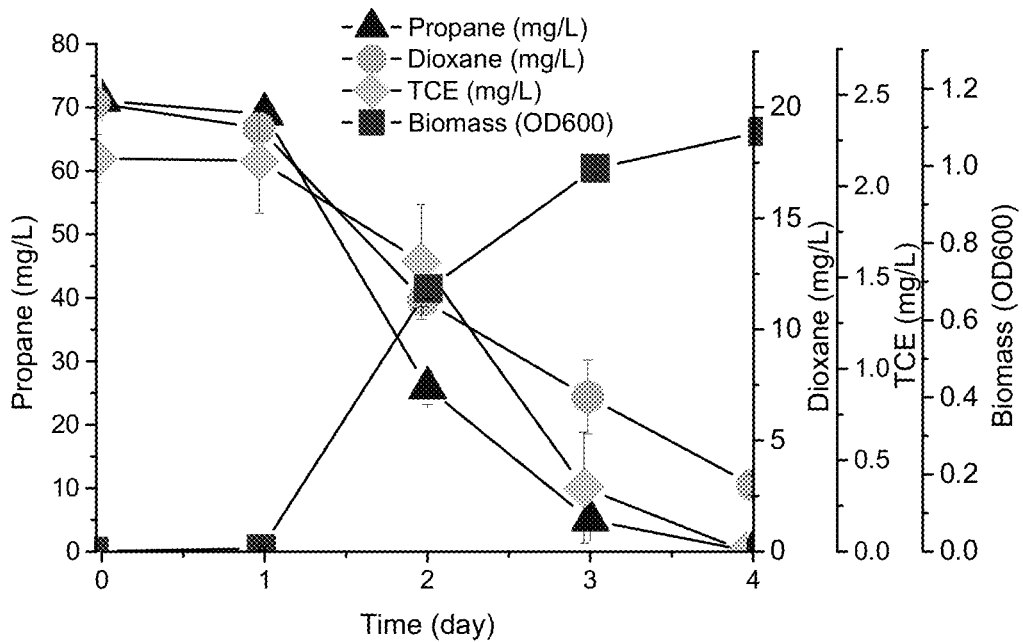
FIG. 19 is a graphical depiction of dioxane and TCE biodegradation by *Mycobacterium* sp. DT1 using propane as the sole carbon and energy source in accordance with one or more embodiments of the present disclosure.

Concurrent biodegradation of dioxane and TCE by *Mycobacterium* sp. DT1. To evaluate the performance of DT1 in the removal of dioxane and TCE when both compounds are concurrently present, simulated microcosms were prepared with DT1 inoculum in BSM medium and dosed with dioxane and TCE. Propane was used as the primary substrate. With reference to FIG. 19 the results showed the presence of TCE showed no significant inhibition to the degradation of dioxane or consumption of propane for growth. After a short lag time (1 d), all the substrates, i.e. propane, dioxane, and TCE, were degraded synchronically. At the end of day 2, the initial 71.1, 20.2, and 2.15 mg/L of propane, dioxane, and TCE were degraded to 25.8, 11.3, and 1.59 mg/L, respectively. TCE was degraded to below the MDL of the GC-FID methods employed (i.e., 0.01 mg/L), and 85% of dioxane was removed from the simulated microcosm after 4 days incubation.

Figure 20A:
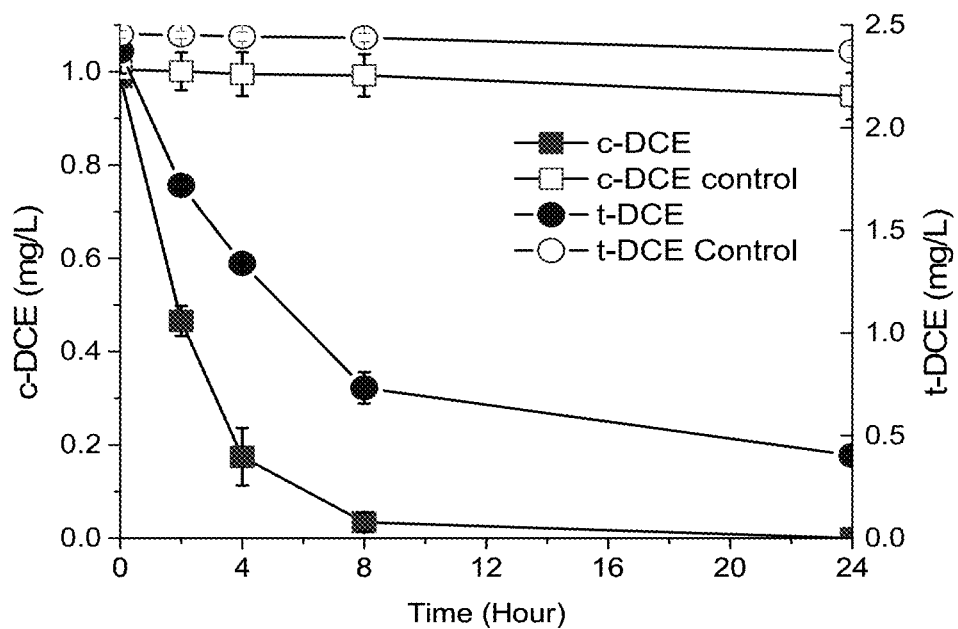
FIGS. 20a-20c are graphical depictions of degradation of CAHs using propane-pregrown *Mycobacterium* sp. DT1 resting cells (FIG. 20a: cis-1,2-DCE and trans-1,2-DCE.
Figure 20B:
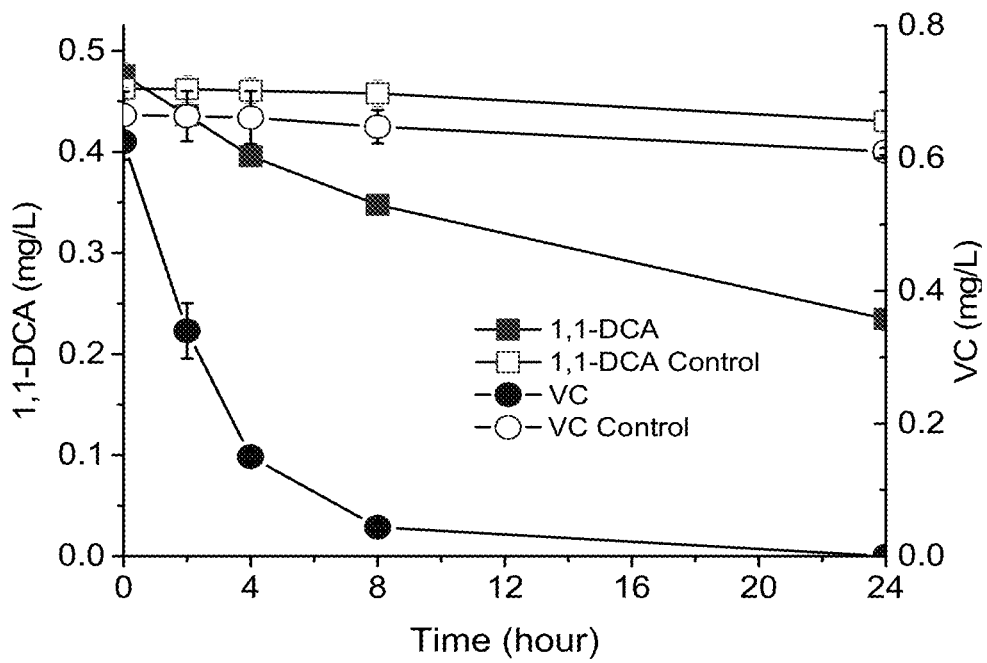
Figure 20C:
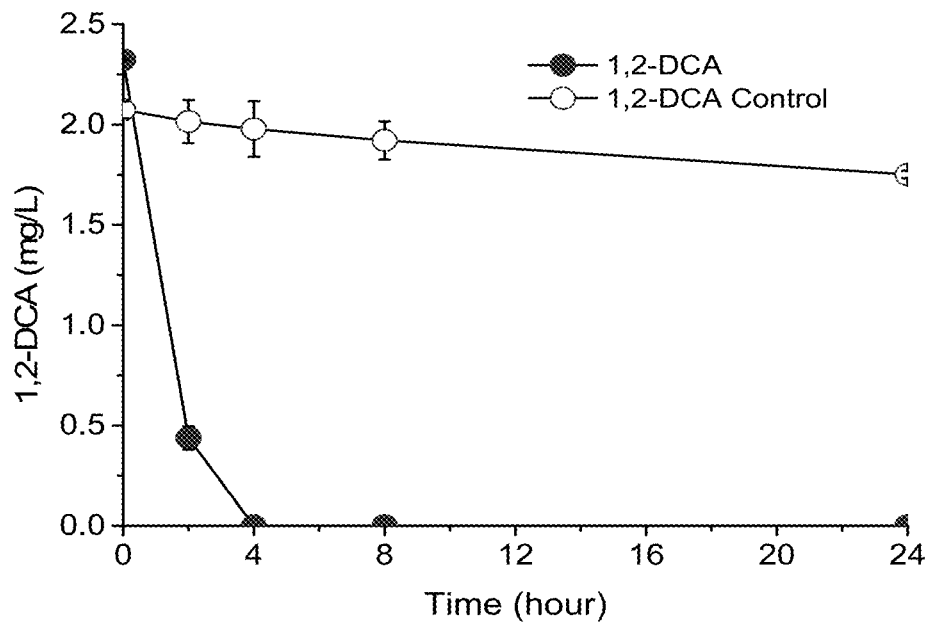

Cometabolism of other CAHs by *Mycobacterium* sp. DT1. The ability of strain DT1 to co-metabolize CAHs was evaluated after being fed with propane. DT1 cells were grown on propane in BSM at 30° C. while shaking at 150 rpm. Five mL of DT1 culture containing biomass equivalent of 0.22 mg protein mL$^{-1}$ was amended in 35-mL serum vials sealed with rubber stoppers and aluminum crimp caps. With reference to FIGS. 20a and 20b, cis-1,2-DCE, trans-1,2-DCE, 1,1-DCA, 1,1,1-TCA, 1,1-DCE, and VC were added at the initial aqueous concentrations of 0.99 mg/L, 2.37 mg/L, 0.48 mg/L, 4.21 mg/L, 6.01 mg/L and 0.67 mg/L, respectively. Given the low KH value of 1,2-DCA (4.01E-02), the initial 2.32 mg/L of 1,2-DCA was estimated as the concentration in the gaseous phase (FIG. 20c). At selected sampling intervals, 100 μL of the headspace was sampled and analyzed by GC for monitoring the disappearance of CAHs. All degradation experiments were conducted in triplicate. Control treatments were prepared with DT1 cells killed by autoclave. With reference to FIGS. 20a-20c the results with resting cells proved that DT1 is able to cometabolize cis-1,2-DCE, trans-1,2-DCE, 1,1-DCA, 1,2-DCA, and VC after growth with propane. However, no degradation of 1,1,1-TCA or 1,1-DCE was observed.

Soluble di-iron monooxygenase (SDIMO) gene sequencing of *Mycobacterium* sp. DT1. Total genomic DNA of DT1 was extracted using the UltraClean Microbial DNA Isolation Kit (MoBio Laboratories, Carlsbad, Calif.) according to the manufacturer's instructions. Genes encoding SDIMOs of DT1 were amplified using the degenerate primer sets for the PCR reactions:

```
                                              (SEQ ID NO 9)
NVC65: 5'-CAR ATG YTN GAY GAR GTN CGN CA-3';

(SEQ ID NO 10)
NVC57: 5'-CAG TCN GAY GAR KCS CGN CAY AT-3';

(SEQ ID NO 11)
NVC66: 5'-CCA NCC NGG RTA YTT RTT YTC RAA CCA-3';
and (SEQ ID NO 12)
NVC58: 5'-CGD ATR TCR TCD ATN GTC CA-3'.
```

See, Nicholas V. Coleman, et al. Soluble di-iron monooxygenase gene diversity in soils, sediments and ethene enrichments. Environmental Microbiology (2006) 8(7), 1228-1239.

Figure 21:
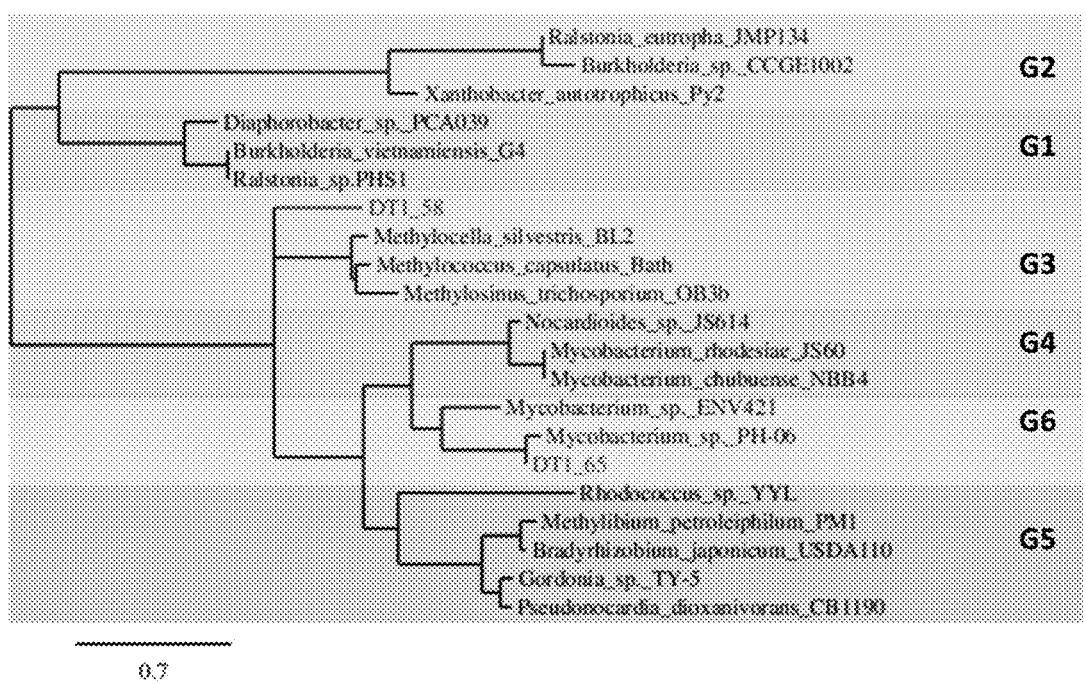
FIG. 21 is a depiction of a neighbor-joining tree showing the phylogenetic relationships of *Mycobacterium* sp. DT1 and all of the 6 subgroups of SDIMOs, wherein the phylogenetic tree is based on the alignment of the amino acid sequences of a subunits in accordance with one or more embodiments of the present disclosure.

The amplified fragments of the SDIMO genes were sequenced in both directions by Eton Bioscience Sequencing Center (Union, N.J.). Two amplicons derived from a subunits of putative SDIMOs were identified and a phylogenetic tree was constructed based on the sequencing results and the representatives from 6 subgroups of SDIMOs (FIG. 21). The results showed the presence of a group-3 butane MO gene and a group-6 propane MO gene in DT1. Given SDIMOs are key enzymes in the bacterial oxidation of hydrocarbons and halogenated hydrocarbons, multiple SDIMO-encoding genes detected in DT1 suggested its degradation versatility and unique application value in environmental biotechnology.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention. All references listed are incorporated by reference herein in their entirety.

REFERENCES

Li, Mengyan, Stephanie Fiorenza, James R. Chatham, Shaily Mahendra, and Pedro J J Alvarez. "1, 4-Dioxane biodegradation at low temperatures in Arctic groundwater samples." Water Research 44, no. 9 (2010): 2894-2900.

Li, Mengyan, Jacques Mathieu, Yuanyuan Liu, E. Tess Van Orden, Yu Yang, Stephanie Fiorenza, and Pedro J J Alvarez. "The abundance of tetrahydrofuran/dioxane monooxygenase genes (thmA/dxmA) and 1, 4-dioxane degradation activity are significantly correlated at various impacted aquifers." Environmental Science & Technology Letters 1, no. 1 (2013): 122-127.

Kelley, Sara L., Eric W. Aitchison, Milind Deshpande, Jerald L. Schnoor, and Pedro J J Alvarez. "Biodegradation of 1, 4-dioxane in planted and unplanted soil: effect of bioaugmentation with Amycolata sp. CB1190." Water Research 35, no. 16 (2001): 3791-3800.

Lippincott, David, Sheryl H. Streger, Charles E. Schaefer, Jesse Hinkle, Jason Stormo, and Robert J. Steffan. "Bioaugmentation and Propane Biosparging for In Situ Biodegradation of 1, 4-Dioxane." Groundwater Monitoring & Remediation 35, no. 2 (2015): 81-92.

Zhang, Shu, Phillip B. Gedalanga, and Shaily Mahendra. "Biodegradation kinetics of 1, 4-dioxane in chlorinated solvent mixtures." Environmental Science & Technology 50, 17 (2016): 9599-9607.

Deng et al., "Synchronic biotransformation of 1,4-dioxane and 1.1-dichloroethylene by a gram-negative propanotroph Azoarcus sp. DD4." Environmental Science & Technology Letters 2018, 5, 526-532.

Deng et al., "A novel propane monooxygenase initiating degradation of 1,4-dioxane by Mycobacterium dioxanotrophicus PH-06." Environmental Science & Technology Letters 5.2 (2017): 86-91.

DoD SERDP. 2013a. "1,4-Dioxane Remediation by Extreme Soil Vapor Extraction (XSVE)." ER-201326.

Nicholas V. Coleman, Nga B. Bui and Andrew J. Holmes. Soluble di-iron monooxygenase gene diversity in soils, sediments and ethene enrichments. Environmental Microbiology (2006) 8(7), 1228-1239.

Lane D. J. (1991) 16S/23S rRNA sequencing. In: Stackebrandt E, Goodfellow M (eds) Nucleic acid techniques in bacterial systematics. Wiley, New York, pp 115-175

Bradford, M. M. A rapid and sensitive method for the quantitation of microgram quantities of protein utilizing the principle of protein-dye binding. 1976. Anal. Biochem. 72:248-254.

Hazen, T. C. 2010. Cometabolic Bioremediation. In Handbook of Hydrocarbon and Lipid Microbiology, p 2505-2514. Springer-Verlag Berlin Heidelberg, 2010.

Asano, M., Kishimoto, N., Shimada, H., and Y. Ono. 2012. "Degradation of 1,4-Dioxane Using Ozone Oxidation with UV Irradiation (Ozone/UV) Treatment." Journal of Environmental Science and Engineering. A (1). 371-279.

Bernhardt, D., Diekmann, H., 1991. Degradation of dioxane, tetrahydrofuran and other cyclic ethers by an environmental Rhodococcus Strain. Appl. Microbiol. Biotechnol. 36, 120-123.

Chen D Z, Jin X J, Chen J, Ye J X, Jiang N X, Chen J M. Intermediates and substrate interaction of 1, 4-dioxane degradation by the effective metabolizer Xanthobacter flavus DT8. International Biodeterioration & Biodegradation, 2016. 106: p. 133-140.

Chu, K. H., Mahendra, S., Song, D. L., Conrad, M. E., Alvarez-Cohen, L., 2004. Stable carbon isotope fractionation during aerobic biodegradation of chlorinated ethenes. Environ. Sci. Technol. 38, 3126-3130.

Deeb R A, Alvarez-Cohen L (1999) Temperature effects and substrate interactions during the aerobic biotransformation of BTEX mixtures by toluene-enriched consortia and Rhodococcus rhodochrous. Biotechnol Bioeng 62:526-536.

Ferro, A. M., Kennedy, J., and J. C. LaRue. 2013. "Phytoremediation of 1,4-Dioxane-Containing Recovered Groundwater." International Journal of Phytoremediation. 15: 911-923.

Faoro, H., Rene Menegazzo, R., Battistoni, F., Gyaneshwar, P., do Amaral, F. P., Taule, C., et al. The oil-contaminated soil diazotroph Azoarcus olearius DQS-4T is genetically and phenotypically similar to the model grass endophyte Azoarcus sp. BH72. Environmental Microbiology Reports 2017. 9, 223-238.

Huang H, Shen D, Li N, Shan D, Shentu J, Zhou Y Y. Biodegradation of 1, 4-dioxane by a novel strain and its biodegradation pathway. Water, Air, & Soil Pollution, 2014. 225(9):1-11.

Kämpfer P, Kroppenstedt R M (2004) Pseudonocardia benzenivorans sp. nov. Int J Syst Evol Microbiol 54:749-751.

Kim Y M, Jeon J R, Murugesan K, Kim E J, Chang Y S (2009) Biodegradation of 1,4-dioxane and transformation of related cyclic compounds by a newly isolated Mycobacterium sp. PH-06. Biodegradation 20:511-519.

Kohlweyer U., Tiemer B, Schräder T, Andreesen J R (2000) Tetrahydrofuran degradation by a newly isolated culture of Pseudonocardia sp. strain K1. FEMS Microbiol Lett 186:301-306.

Kukor J J, Olsen R H (1990) Molecular cloning, characterization, and regulation of a Pseudomonas pickettii PKO1 gene encoding phenol hydroxylase and expression of the gene in Pseudomonas aeruginosa PAO1c. J Bacteriol 172: 4624-4630.

Mahendra S, Alvarez-Cohen L. 2006. Kinetics of 1,4-dioxane biodegradation by monooxygenase-expressing bacteria. Environ. Sci. Technol. 40: 5435-5442.

Mahendra S, Petzold C J, Baidoo E E, Keasling J D, Alvarez-Cohen L. 2007. Identification of the intermediates of in vivo oxidation of 1,4dioxane by monooxygenase-containing bacteria. Environ. Sci. Technol. 41:7330-7336.

Matsui R, Takagi K, Sakakibara F, Abe T, Shiiba K. Identification and characterization of 1,4-dioxane-degrading microbe separated from surface seawater by the seawater-charcoal perfusion apparatus. Biodegradation. 2016 27:155-163.

Min, B. K., Heo, J. E., Youn, N. K., Joo, O. S., Lee, H., Kim, J. H., and H. S. Kim. 2009. "Tuning of the Photocatalytic 1,4-Dioxane Degradation with Surface Plasmon Resonance of Gold Nanoparticles on Titania." Catalysis Communications. 10 (5). 712-715.

Nelson M J K, Montgomery S O, O'Neill E J, Pritchard P H (1986) Aerobic metabolism of trichloroethylene by a bacterial isolate. Appl Environ Microbiol 52:383-384.

Parales, R. E., Adamus, J. E., White, N., May, H. D., 1994. Degradation of 1,4-dioxane by an Actinomycete in pure culture. Appl. Environ. Microbiol. 60, 4527-4530.

Prabahar V, Dube S, Reddy G S N, Shivaji S (2004) Pseudonocardia *antarctica* sp. nov. an Actinomycetes from McMurdo Dry Valleys, *Antarctica*. System Appl Microbiol 27:66-71.

Prior S. and Dalton H, 1985. Acetylene as a suicide substrate and active site probe for methane monooxygenase from *Methylococcus capsulatus* (Bath). FEMS Microbiology Letters. 29, 105-109.

Pugazhendi A, Rajesh Banu J, Dharamani J, Yeom I T. Biodegradation of 1, 4-dioxane by Rhodanobacter AYSS and the role of additional substrates. Annals of Microbiology, 2015. 65(4): p. 2201-2208.

Sei K, Miyagaki K, Kakinoki T, Fukugasako K, Inoue D, Ike M. Isolation and characterization of bacterial strains that have high ability to degrade 1,4-dioxane as a sole carbon and energy source. Biodegradation, 2013a. 24: 665-674.

Sei K, Oyama M, Kakinoki T, Inoue D, Ike M Isolation and characterization of tetrahydrofuran-degrading bacteria for 1,4-dioxane-containing wastewater treatment by cometabolic degradation. J Water Environ Technol. 2013b. 11:11-19.

Sun B, Ko K, Ramsay J A (2011) Biodegradation of 1,4-dioxane by a *Flavobacterium*. Biodegradation 22:651-659.

Vainberg S, McClay K, Masuda H, Root D, Condee C, Zylstra G J, Steffan R J (2006) Biodegradation of ether pollutants by Pseudonocardia sp. strain ENV478. Appl Environ Microbiol 72:5218-5224.

Whited G M, Gibson D T (1991) Separation and partial characterization of the enzymes of the toluene-4-monooxygenase catabolic pathway in *Pseudomonas mendocina* KR1. J Bacteriol 173:3017-3020.

Zenker M J, Borden R C, Barlaz M A (2003) Occurrence and treatment of 1,4 dioxane in aqueous environments. Environ Eng Sci 20:423-432.

U.S. Department of Health and Human Services (DHHS). 2011. "Report on Carcinogens, Twelfth Edition." Public Health Service, National Toxicology Program. 12th Edition.

EPA Integrated Risk Information System (IRIS). 2013. "1,4-Dioxane (CASRN 123-91-1)." www.epa.gov/iris/subst/0326.htm.

DoD SERDP. 2013c. "Evaluation of Branched Hydrocarbons as Stimulants for In Situ Cometabolic Biodegradation of 1,4-Dioxane and Its Associated Co-Contaminants." ER-2303.

Nakamiya, K., Hashimoto, S., Ito, H., Edmonds, J. S., Morita, M., 2005. Degradation of 1,4-dioxane and cyclic ethers by an isolated fungus. Appl. Environ. Microbiol. 71, 1254-1258.

Skinner, K., Cuiffetti, L., Hyman, M., 2009. Metabolism and cometabolism of cyclic ethers by a Filamentous Fungus, a Graphium sp. Appl. Environ. Microbiol. 75, 5514-5522.

Yen, K. M., Karl, M. R., Blatt, L. M., Simon, M. J., Winter, R. B., Fausset, P. R., Lu, H. S., Harcourt, A. A., Chen, K. K., 1991. Cloning and characterization of a *Pseudomonas mendocina* KR1 gene cluster encoding toluene-4-monooxygenase. J. Bacteriol. 173, 5315-5327.

Altschul, S. F., Gish, W., Miller, W., Myers, E. W. and Lipman, D. J. (1990). Basic local alignment search tool. Journal of molecular biology 215(3), 403-410.

Ashburner, M., Ball, C. A., Blake, J. A., Botstein, D., Butler, H., Cherry, J. M., Davis, A. P., Dolinski, K., Dwight, S. S. and Eppig, J. T. (2000). Gene Ontology: tool for the unification of biology. Nature genetics 25(1), 25.

Besemer, J., Lomsadze, A. and Borodovsky, M. (2001). GeneMarkS: a self-training method for prediction of gene starts in microbial genomes. Implications for finding sequence motifs in regulatory regions. Nucleic Acids Research 29(12), 2607-2618.

Boeckmann, B., Bairoch, A., Apweiler, R., Blatter, M.-C., Estreicher, A., Gasteiger, E., Martin, M. J., Michoud, K., O'donovan, C. and Phan, I. (2003). The SWISS-PROT protein knowledgebase and its supplement TrEMBL in 2003. Nucleic Acids Research 31(1), 365-370.

Consortium, U. (2014) UniProt: a hub for protein information. Nucleic Acids Research, gku989.

Kanehisa, M., Goto, S., Hattori, M., Aoki-Kinoshita, K. F., Itoh, M., Kawashima, S., Katayama, T., Araki, M. and Hirakawa, M. (2006). From genomics to chemical genomics: new developments in KEGG. Nucleic Acids Research 34(suppl_1), D354-D357.

Kanehisa, M., Goto, S., Sato, Y., Furumichi, M. and Tanabe, M. (2011). KEGG for integration and interpretation of large-scale molecular data sets. Nucleic Acids Research 40(D1), D109-D114.

Leahy, J. G., Batchelor, P. J. and Morcomb, S. M. (2003). Evolution of the soluble diiron monooxygenases. Ferns Microbiology Reviews 27(4), 449-479.

Li, W., Jaroszewski, L. and Godzik, A. (2002). Tolerating some redundancy significantly speeds up clustering of large protein databases. Bioinformatics 18(1), 77-82.

Notomista, E., Lahm, A., Di Donato, A. and Tramontano, A. (2003). Evolution of bacterial and archaeal multicomponent monooxygenases. J Mol Evol 56(4), 435-445.

Saier Jr, M. H., Reddy, V. S., Tamang, D. G. and Västermark, Å. (2013). The transporter classification database. Nucleic Acids Research 42(D1), D251-D258.

Tatusov, R. L., Fedorova, N. D., Jackson, J. D., Jacobs, A. R., Kiryutin, B., Koonin, E. V., Krylov, D. M., Mazumder, R., Mekhedov, S. L. and Nikolskaya, A. N. (2003). The COG database: an updated version includes eukaryotes. BMC bioinformatics 4(1), 41.

What is claimed is:

1. A method of removing dioxane and optionally one or more CAHs selected from 1,1-DCE, cis-1,2-DCE, trans-1,2-DCE, 1,2-DCA, 1,1-DCA, VC, and TCE from a liquid medium contaminated therewith comprising applying a feedstream of propane to the liquid medium in the presence of at least one propanotrophic bacteria strain selected from *Azoarcus* sp. DD4 (DD4) and *Mycobacterium* sp. DT1 (DT1).

2. The method of claim 1 comprising introducing DD4 or DT1 to the liquid medium.

3. The method of claim 1 comprising monitoring the level(s) of one or more of the dioxane and CAHs present in the liquid medium during the course of application of propane at selected intervals to determine the presence, absence, or level of at least one of the dioxane or CAHs in the liquid medium.

4. The method of claim 1 comprising measuring the level of the propanotrophic bacteria strain present in the liquid medium.

5. The method of claim 1 wherein the propanotrophic bacteria strain is DD4.

6. The method of claim 5 wherein the DD4 is operable to remove dioxane and optionally one or more of the CAHs 1,1-DCE, cis-1,2-DCE, 1,2-DCA, and VC from the liquid medium.

7. The method of claim 6 comprising applying propane to the liquid medium until the dioxane and or one or more of the CAHs 1,1-DCE, cis-1,2-DCE, 1,2-DCA, and VC are present at or below a preselected limit.

8. The method of claim 1 wherein the propanotrophic bacteria strain is DT1.

9. The method of claim 8 wherein the DT1 is operable to remove dioxane and optionally one or more of the CAHs cis-1,2-DCE, trans-1,2-DCE, 1,2-DCA, 1,1-DCA, VC, and TCE from the liquid medium.

10. The method of claim 9 comprising applying propane to the liquid medium until the dioxane and or one or more of the CAHs cis-1,2-DCE, trans-1,2-DCE, 1,2-DCA, 1,1-DCA, VC, and TCE are present at or below a preselected limit.

11. The method of claim 1 wherein the method employs DD4 and DT1.

12. The method of claim 11 comprising applying propane to the liquid medium until the dioxane and or one or more of the CAHs 1,1-DCE, cis-1,2-DCE, trans-1,2-DCE, 1,2-DCA, 1,1-DCA and TCE are present at or below a preselected limit.

13. A method of removing dioxane and optionally one or more CAHs selected from 1,1-DCE, cis-1,2-DCE and 1,2-DCA from a liquid medium contaminated therewith by applying a feedstream of propane, 1-propanol and or 1-butanol to the contaminated liquid medium in the presence of DD4.

14. The method of claim 13 comprising introducing DD4 to the liquid medium.

\* \* \* \* \*

SEQUENCE LISTING

```
<160> NUMBER OF SEQ ID NOS: 12

<210> SEQ ID NO 1
<211> LENGTH: 45
<212> TYPE: DNA
<213> ORGANISM: Artificial Sequence
<220> FEATURE:
<223> OTHER INFORMATION: primer

<400> SEQUENCE: 1
```
agatatagga tccatgactg ctggattgac actcaacaag atcac          45

<210> SEQ ID NO 2
<211> LENGTH: 42
<212> TYPE: DNA
<213> ORGANISM: Artificial Sequence
<220> FEATURE:
<223> OTHER INFORMATION: primer

<400> SEQUENCE: 2
agatataaag cttggtgcgg tagtagtcct cgtagatcca gc             42

<210> SEQ ID NO 3
<211> LENGTH: 33
<212> TYPE: DNA
<213> ORGANISM: Artificial Sequence
<220> FEATURE:
<223> OTHER INFORMATION: primer

<400> SEQUENCE: 3
agatataaag cttcgagttc ggcctgggca tgg                       33

<210> SEQ ID NO 4
<211> LENGTH: 34
<212> TYPE: DNA
<213> ORGANISM: Artificial Sequence
<220> FEATURE:
<223> OTHER INFORMATION: primer

<400> SEQUENCE: 4
agatataggt accggatcat cgcgggcagg tagg                      34

<210> SEQ ID NO 5
<211> LENGTH: 34
<212> TYPE: DNA
<213> ORGANISM: Artificial Sequence
<220> FEATURE:
<223> OTHER INFORMATION: primer

<400> SEQUENCE: 5
agatataaag cttcatcttc gagaacgccg accc                      34

<210> SEQ ID NO 6
<211> LENGTH: 36
<212> TYPE: DNA
<213> ORGANISM: Artificial Sequence
<220> FEATURE:
<223> OTHER INFORMATION: primer

<400> SEQUENCE: 6
agatatagaa ttccacatgt tgcagacgta gggcag                    36

<210> SEQ ID NO 7
<211> LENGTH: 33
<212> TYPE: DNA
<213> ORGANISM: Artificial Sequence
<220> FEATURE:
<223> OTHER INFORMATION: primer

<400> SEQUENCE: 7
agatatagaa ttcgaacggc gacgacatcc tgg                       33

<210> SEQ ID NO 8
<211> LENGTH: 37
<212> TYPE: DNA

```
<213> ORGANISM: Artificial Sequence
<220> FEATURE:
<223> OTHER INFORMATION: primer

<400> SEQUENCE: 8
agatatagga tcctcctgca tcaggttgta ggtacgg                               37

<210> SEQ ID NO 9
<211> LENGTH: 23
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (9)..(9)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t
<220> FEATURE:
<221> NAME/KEY: misc_feature
<222> LOCATION: (21)..(21)
<223> OTHER INFORMATION: n is a, c, g, or t

<400> SEQUENCE: 9
caratgytng aygargtncg nca                                              23

<210> SEQ ID NO 10
<211> LENGTH: 23
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (6)..(6)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t

<400> SEQUENCE: 10
cagtcngayg arkcscgnca yat                                              23

<210> SEQ ID NO 11
<211> LENGTH: 27
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (4)..(4)
<223> OTHER INFORMATION: n is a, c, g, or t
<220> FEATURE:
<221> NAME/KEY: misc_feature
<222> LOCATION: (7)..(7)
<223> OTHER INFORMATION: n is a, c, g, or t

<400> SEQUENCE: 11
ccanccnggr tayttrttyt craacca                                          27

<210> SEQ ID NO 12
<211> LENGTH: 20
<212> TYPE: DNA
<213> ORGANISM: Artificial Sequence
<220> FEATURE:
<223> OTHER INFORMATION: primer
```

```
<220> FEATURE:
<221> NAME/KEY: misc_feature
<222> LOCATION: (15)..(15)
<223> OTHER INFORMATION: n is a, c, g, or t

<400> SEQUENCE: 12
cgdatrtcrt cdatngtcca                                              20
```